(12) United States Patent
Yamashita

(10) Patent No.: US 9,715,643 B2
(45) Date of Patent: Jul. 25, 2017

(54) LABEL CREATION APPARATUS, LABEL CREATION METHOD, AND LABEL CREATION PROGRAM

(71) Applicant: Seiko Epson Corporation, Tokyo (JP)

(72) Inventor: Mitsuhiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/163,569

(22) Filed: May 24, 2016

(65) Prior Publication Data

US 2016/0357996 A1 Dec. 8, 2016

(30) Foreign Application Priority Data

Jun. 3, 2015 (JP) ................................. 2015-112891
Jul. 7, 2015 (JP) ................................. 2015-135877

(51) Int. Cl.
*G06K 19/06* (2006.01)
*G06K 15/02* (2006.01)

(52) U.S. Cl.
CPC ....... *G06K 15/022* (2013.01); *G06K 15/1868* (2013.01); *G06K 15/1885* (2013.01); *G06K 15/1889* (2013.01)

(58) Field of Classification Search
CPC G06K 19/06; G06F 17/00; G06F 3/12; G06F 15/12
USPC ......................................... 235/494, 375, 432
See application file for complete search history.

(56) References Cited

U.S. PATENT DOCUMENTS

2007/0262141 A1* 11/2007 Ito .......................... B41J 3/4075
235/383
2010/0257210 A1* 10/2010 Witkin .............. G06F 17/30274
707/802

FOREIGN PATENT DOCUMENTS

| JP | 06-24086 A | 2/1994 |
| JP | 2006-134230 A | 5/2006 |
| JP | 2014-213605 A | 11/2014 |

* cited by examiner

*Primary Examiner* — Edwyn Labaze
(74) *Attorney, Agent, or Firm* — ALG Intellectual Property, LLC

(57) ABSTRACT

A label creation apparatus includes a drawing processing section that draws a label image of a label, a first object specifying section that arranges a first object in the label image, a second object specifying section that specifies whether or not a second object having a window area transparent to the first object and having a drawing area along the outermost contour of the label image is arranged in the label image, and the drawing processing section arranges the first object in the label image in such a way that the first object falls within the window area of the second object when the second object is arranged, whereas arranging the first object in the label image in such a way that the first object extends to an area containing the outermost contour of the label image when the second object is not arranged.

11 Claims, 18 Drawing Sheets

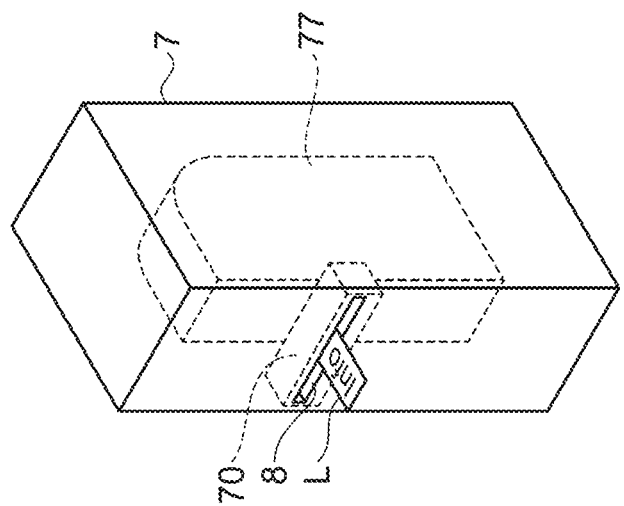
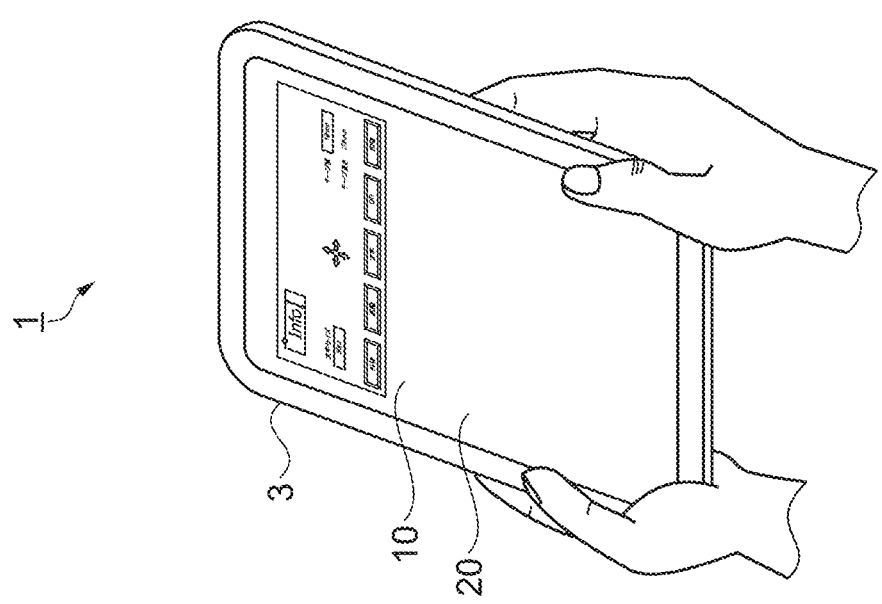
FIG. 1

LABEL CREATION APPARATUS, LABEL CREATION METHOD, AND LABEL CREATION PROGRAM

CROSS-REFERENCE TO RELATED APPLICATION

The entire disclosure of Japanese Patent Application No. 2015-112891, filed Jun. 3, 2015 and Japanese Patent Application No. 2015-135877, filed Jul. 7, 2015 are expressly incorporated by reference herein.

BACKGROUND

1. Technical Field

The present invention relates to a label creation apparatus, a label creation method, and a label creation program for creating a label on which image data having an information function, such as a letter, a mark, and a barcode, is printed.

2. Related Art

There has been a known printing apparatus that arranges image data, such as a photographed image, in a decorative frame and prints the image data arranged in the frame.

For example, JP-A-2006-134230 discloses an image editing apparatus that automatically changes how to fit image data to a frame in accordance with the presence or absence of a decorative frame and arranges the image data in the frame accordingly. In detail, the image data is so maximized and arranged as to fit to a decorative frame (image data enlargement), or the image data is so minimized and arranged as to fit to a non-decorative frame (imaged data reduction). When the thus arranged image data is printed, a printed photograph with the decorative frame is easy to look at because a central portion of the photograph is enlarged, whereas a printed photograph with no decorative frame allows a viewer to grasp the wholeness of the photograph.

On the other hand, there is a desire to arrange a functional object having an information function, such as letter data, a mark that provides a caution or an alarm, a barcode, and a QR code (registered trademark), in a decorative frame and print the functional object arranged in the decorative frame. In particular, there is a desire to provide a label creation apparatus that is easy to operate and capable of arranging such a functional object, for example, on a tape to create a label.

However, when a functional object, such as those described above, is arranged in a frame by using the method described in JP-A-2006-134230 and the functional object arranged in the frame is printed, it is difficult to correctly read information contained in the functional object in some cases.

In detail, when an object is arranged in a decorative frame by using the method described in JP-A-2006-134230, part of the object (periphery thereof, in particular) is undesirably hidden behind the decorative frame in some cases when printed. On the other hand, when the object is arranged in a non-decorative frame, the printed object is undesirably reduced more than necessary. When the object is a functional object, it is difficult to acquire correct information because information contained in the portion hidden behind the decorative frame is missing.

On the other hand, when a barcode, a QR code, or any other functional object is reduced more than necessary, it is difficult to understand information contained in the printed image because the image pattern of the functional object is degraded.

SUMMARY

An advantage of some aspects of the invention is to provide a label creation apparatus, a label creation method, and a label creation program capable of readily arranging a functional object with possibility of imperfection of information contained in the functional object lowered.

APPLICATION EXAMPLE 1

A label creation apparatus according to this application example is a label creation apparatus that creates a label printed on a medium, the apparatus including a drawing processing section that draws a label image of the label, a first object specifying section that specifies a position and a size of a first object to be drawn in the label image, a second object specifying section that specifies whether or not a second object having a window area transparent to the first object drawn in the label image and having a drawing area along an outermost contour of the label image is arranged in the label image, and a print section that prints at least one of the first object and second object drawn in the label image on the medium, wherein the drawing processing section arranges the first object in the label image in such a way that the first object falls within the window area of the second object when the second object specifying section specifies that the second object is arranged, whereas arranging the first object in the label image in such a way that the first object extends to an area containing the outermost contour of the label image when the second object specifying section specifies that the second object is not arranged.

According to this application example, when the second object is specified, the first object is so arranged as to fall within the window area of the second object, whereby the first object can be so arranged as not to be hidden behind the second object. When the second object is not specified, the first object is so arranged as to extend to the outermost contour of the label image, whereby the first object can be so arranged as to be maximized in the label image. For example, when the second object is a decorative frame and the first object is a functional object, the functional object is not hidden behind the decorative frame, whereas when no decorative frame is present, the first object is so arranged as to be maximized in the label image. Possibility of imperfection of information contained in the functional object is therefore lowered.

Further, since the first and second objects are arranged by the drawing processing section, the functional object can be readily arranged with no need of an operator's manual operation.

The label creation apparatus provided by this application example therefore allows a functional object to be readily arranged with possibility of imperfection of information contained in the functional object lowered.

APPLICATION EXAMPLE 2

When the second object is arranged, the drawing processing section described in the application example may calculate, on the basis of information on a position and a size of the window area, the position and the size in accordance with which the first object is arranged, whereas when the second object is not arranged, the drawing processing section may calculate, on the basis of a size of the label image, the position and the size in accordance with which the first object is arranged.

According to this application example, when the second object and the first object are arranged, the first object can be so arranged as to reliably fall within the window area of the second object. When only the first object is arranged, the first object can be arranged in an arbitrary position at an arbitrary size including a maximum size in the label image.

APPLICATION EXAMPLE 3

The drawing processing section described in the application example may include a medium selection processing section that selects, on the basis of a size of the label image and at least one of a data density, the arrangement position, and the size of the first object that are specified by the first object specifying section, a candidate of a size of the medium on which the label image is printed.

According to this application example, the data density, the arrangement position, and the size of the first object have priority to the size of the medium. The first object can therefore be printed on the medium with no omission of information contained in the first object by using a specified data density, arrangement position, and size.

APPLICATION EXAMPLE 4

When the first object is arranged in a position or at a size that causes the first object to extend off an area of the label image, the medium selection processing section described in the application example may select, as the candidate, a size of the medium in such a way that the size corresponds to an area including the label image and extended to the area where the first object is arranged.

According to this application example, when the first object contains a large amount of information, the first object can be printed on an increased-size medium with no omission of information contained in the first object.

APPLICATION EXAMPLE 5

The medium selection processing section described in the application example may calculate an object print size that reflects the data density of the first object and select, as the candidate, a size of the medium in such a way that the size is based on the object print size.

According to this application example, a medium capable of precisely reflecting information contained in the first object to be printed on the medium can be selected. Further, since the object print size reflects the data density of the first object, a necessary and sufficient size of the medium can be selected. For example, when the first object has a low data density, a medium having a reduced size can be selected. In this case, the consumption of the medium can be reduced.

APPLICATION EXAMPLE 6

When the second object is arranged, the drawing processing section described in the application example may calculate the position and the size in accordance with which the first object is so arranged that boundary areas of the first object and the second object overlap with each other.

According to this application example, the number of variations of design in which the first and second objects are arranged can be increased.

APPLICATION EXAMPLE 7

The first object described in the application example may include at least one of image data, letter font data, and image data formed of readably patterning letter information.

According to this application example, the first object can be a wide variety of objects, such as typical image data and a functional object having an information function.

APPLICATION EXAMPLE 8

The second object described in the application example may be a surrounding pattern that surrounds the first object in the label image.

According to this application example, the second object can, for example, be a decorative frame that decorates a portion around the first object.

APPLICATION EXAMPLE 9

The label creation apparatus described in the application example may further include a display section that displays the label image of the label.

According to this application example, the display section allows the operator to visually recognize the state of the label image.

APPLICATION EXAMPLE 10

A label creation method according to this application example is a label creation method for creating a label printed on a medium, the method including a drawing processing step of drawing a label image of the label, a first object specifying step of specifying a position and a size of a first object to be drawn in the label image, and a second object specifying step of specifying whether or not a second object having a window area transparent to the first object drawn in the label image and having a drawing area along an outermost contour of the label image is arranged in the label image, wherein the drawing processing step arranges the first object in the label image in such a way that the first object falls within the window area of the second object when the second object specifying step specifies that the second object is arranged, whereas arranging the first object in the label image in such a way that the first object extends to an area containing the outermost contour of the label image when the second object specifying step specifies that the second object is not arranged.

According to this application example, when the second object is specified, the first object is so arranged as to fall within the window area of the second object, whereby the first object can be so arranged as not to be hidden behind the second object. When the second object is not specified, the first object is so arranged as to extend to the outermost contour of the label image, whereby the first object can be so arranged as to be maximized in the label image. For example, when the second object is a decorative frame and the first object is a functional object, the functional object is not hidden behind the decorative frame, whereas when no decorative frame is present, the first object is so arranged as to be maximized in the label image. Possibility of imperfection of information contained in the functional object is therefore lowered.

Further, since the first and second objects are arranged by the drawing processing step, the functional object can be readily arranged with no need of the operator's manual operation.

The label creation method provided by this application example therefore allows a functional object to be readily arranged with possibility of imperfection of information contained in the functional object lowered.

APPLICATION EXAMPLE 11

A label creation program according to this application example causes a computer to execute the label creation method according to the application example described above.

Using the label creation program according to this application example allows provision of a label creation method that lowers possibility of imperfection of information contained in a functional object arranged in the label image.

BRIEF DESCRIPTION OF THE DRAWINGS

The invention will be described with reference to the accompanying drawings, wherein like numbers reference like elements.

FIG. 1 is a descriptive diagram showing an overview of a label creation apparatus.

DESCRIPTION OF EXEMPLARY EMBODIMENTS

Embodiments of the invention will be described below with reference to the drawings. In the following drawings, each portion and each screen are so drawn at scales different from actual scales as to be large enough to be recognizable.

First Embodiment

Overview of Label Creation Apparatus

Figure 4:
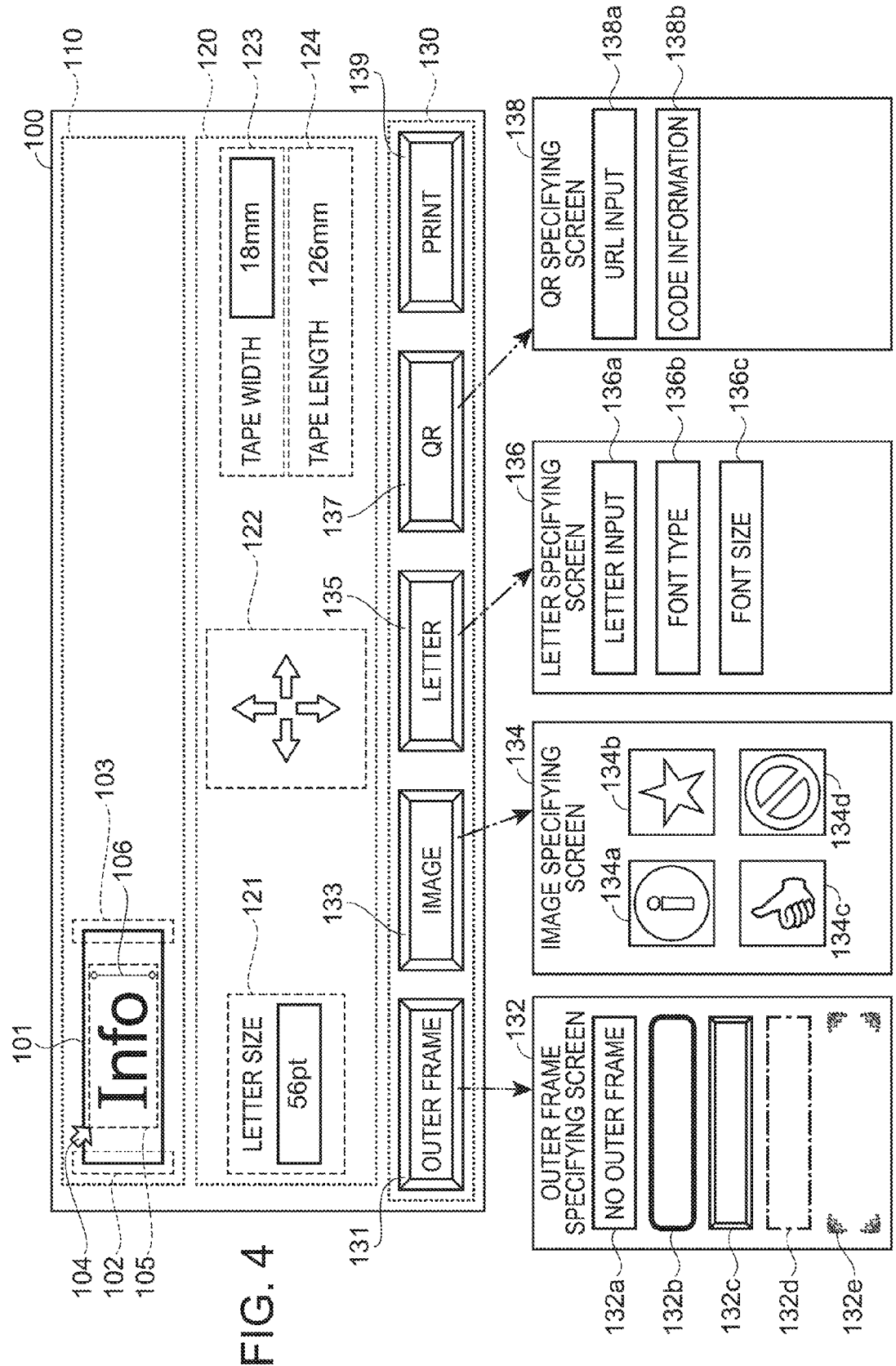
FIG. 4 shows an example of a label editing screen displayed on a mobile terminal.

FIG. 1 is a descriptive diagram showing an overview of a label creation apparatus. FIG. 4 shows an example of a label editing screen displayed on a mobile terminal.

The label creation apparatus 1 is an apparatus that prints a variety of designs on an elongated medium (hereinafter referred to as a tape) to create a label L. The label creation apparatus 1 in the present embodiment is formed of a mobile terminal 3, which is used to edit a design on the label L, and a print apparatus 7, which prints the design on a tape. The mobile terminal 3 and the print apparatus 7 are so connected to each other as to be capable of data communication via communication 2.

The mobile terminal 3 is realized by a tablet terminal, a smartphone (mobile phone), a notebook personal computer, or any other apparatus and includes a display section 10 and an operation section 20. In the example shown in FIG. 1, the mobile terminal 3 is a tablet terminal byway of example with a liquid crystal panel as the display section 10 and a touch panel as the operation section 20.

The display section 10 displays a label editing screen 100 (FIG. 4), and an operator of the mobile terminal 3 taps the touch panel, specifically, a portion thereof corresponding to a button or any other object displayed on the label editing screen 100 to create a design image of a label (label image 101 on label editing screen 100). On the label editing screen 100, the operator can select an object, such as "outer frame," "image," "letter," and "QR," and can specify the position and size of the selected object and arrange the resultant object in a label image 101. The "outer frame" represents, for example, a decorative frame. The "image" handles arbitrary image data and primarily represents a mark providing a caution, an alarm, or any other type of notification. The "letter" represents arbitrary letter data, and the "QR" represents a QR code (registered trademark) formed of patterned letter information. When a print button 139 is tapped, data on the label image 101 is transmitted to the print apparatus 7 via the communication 2. A tape cartridge 77, which accommodates a rolled tape, is loaded into the print apparatus 7, and a print mechanism 70 prints the received data on the tape. The tape on which the data has been printed is ejected as a label L out of an ejection port 8. On the label L is printed a design exactly corresponding to the displayed label image 101.

The outer frame arranged in the label image 101 on the label editing screen 100 corresponds to a second object. The image, the letter, and the QR code are examples of the functional object and correspond to a first object.

The QR code is an example of image data formed of readably patterned letter information and may be a barcode, a two-dimensional barcode, and a matrix code as a functional object similar to those described above.

Configuration of Label Creation Apparatus

Figure 2:
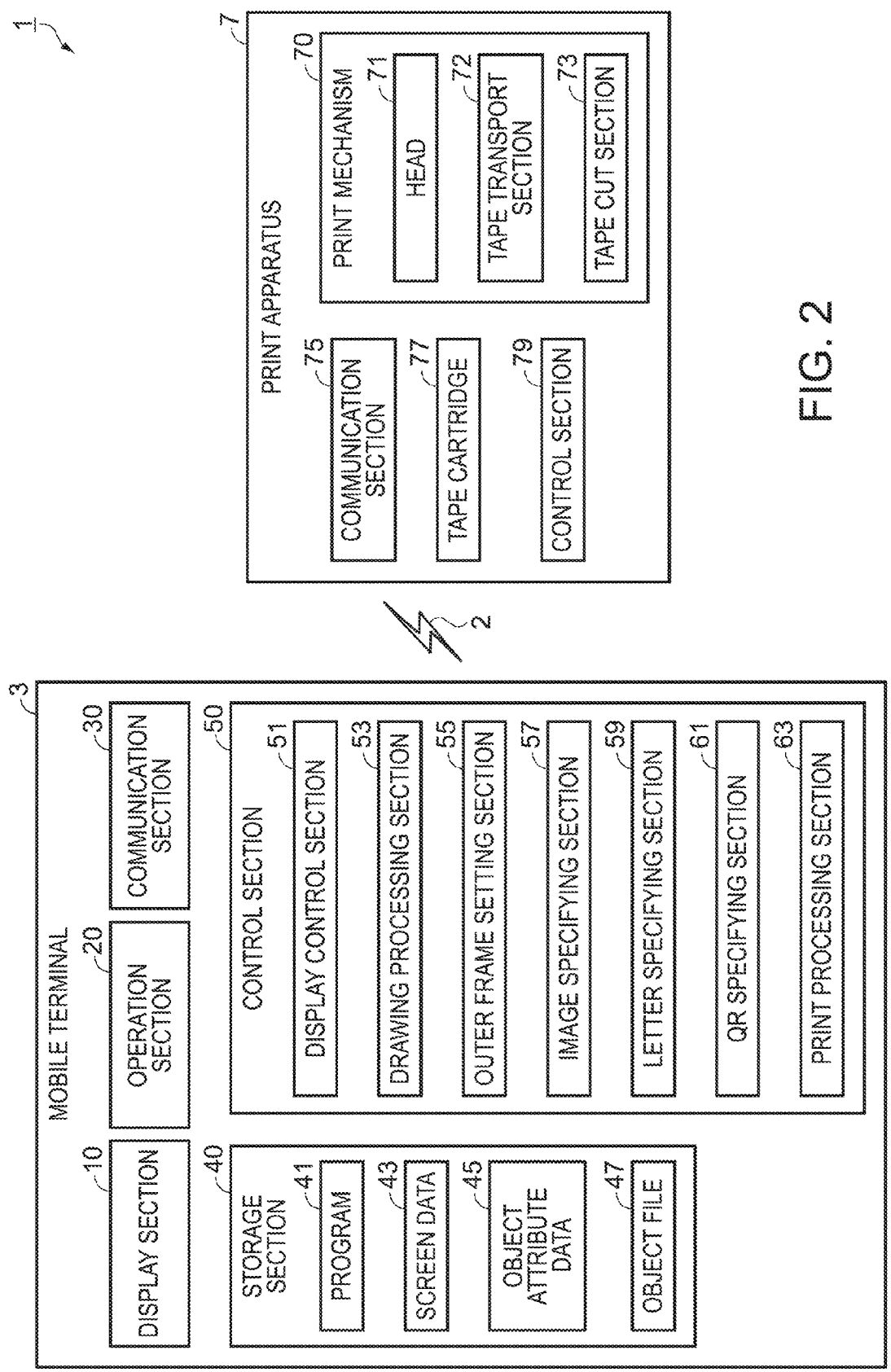
FIG. 2 is a block diagram schematically showing the configuration of the label creation apparatus.

The configurations of the mobile terminal 3 and the print apparatus 7, which form the label creation apparatus 1, will next be described with reference to FIG. 2. FIG. 2 is a block diagram schematically showing the configuration of the label creation apparatus.

Configuration of Print Apparatus

The print apparatus 7 includes the print mechanism 70, a communication section 75, the tape cartridge 77, a control section 79, and other components. The print apparatus 7 corresponds to a print section.

The print mechanism 70 includes a head 71, a tape transport section 72, a tap cut section 73, and other components.

The head 71 is a thermal head and performs printing with a fed tape and an ink ribbon sandwiched between a platen and a roller. The tape transport section 72 is formed of a motor, a transport roller, and other components, transports the tape from the tape cartridge 77 to the head 71, and transports the tape from the head 71 to the ejection port 8. The tape cut section 73 is formed of a tape cutter and a driver thereof and cuts a printed tape portion along the tape width direction in a state in which the tape transportation is suspended.

The communication section 75 is a short-distance wireless adapter that complies with Bluetooth (registered trademark) as a preferable example or any other standard, shares a common communication protocol with a communication section 30 of the mobile terminal 3, receives data on the label image 101, command data, and other types of data, and transmits a response signal and other signals. The communication section 75 may instead be provided with a wireless LAN adaptor or a wired communication adaptor and so connected to the communication section 30 of the mobile terminal 3 that the two communication sections can communicate with each other.

The tape cartridge 77 accommodates a rolled tape and is removably loaded into the print apparatus 7. The tape cartridge 77 is provided on a tape width basis and on a tape surface color basis.

The control section 79 is formed, for example, of a processor, such as a CPU (central processing unit) and a DSP (digital signal processor), and a storage device, such as a ROM (read only memory), a flash ROM, and a RAM (random access memory), controls the print mechanism 70, the communication section 75, and other components that form the print apparatus 7, and performs communication control for communication with the mobile terminal 3, print control for printing on the tape, and other types of control. For example, the control section 79 establishes communication with the mobile terminal 3, detects the width of the tape in the loaded tape cartridge 77, and transmits the tape width to the mobile terminal 3. Upon reception of data on the label image 101 from the mobile terminal 3, the control section 79 causes the print mechanism 70 to print the data on the tape. When the length of the printed portion reaches the length of the label image 101 received from the mobile terminal 3, the control section 79 causes the tape cut section 73 to cut the tape to create a label L. Further, upon reception of command data on the print control, such as the number of labels L to be printed and a tape cut method (for example, the tape is cut whenever print operation is completed or the tape is not cut and data is continuously printed on the tape), the control section 79 can also perform printing on the basis of the command data.

Configuration of Mobile Terminal

The mobile terminal 3 includes the display section 10, the operation section 20, the communication section 30, a storage section 40, a control section 50, and other components.

The display section 10 is a display device that has a typical LCD (liquid crystal display) or any other display panel and performs a variety of types of display on the basis of a display signal inputted from the control section 50.

The operation section 20 is an input device having a touch panel or any other component and outputs a signal from the touch panel on which operation (such as touching) is performed to the control section 50. The operation section 20 may instead be button switches, a keyboard, a mouse, or any other component. In this case, a signal produced by pressing of a button switch or a key of the keyboard or operation of the mouse is outputted to the control section 50.

The communication section 30 is a short-distance wireless adapter that complies with Bluetooth as a preferable example or any other standard, shares a common communication protocol with the communication section 75 of the print apparatus 7, transmits data on the label image 101 and other types of information via the communication 2, and receives a response signal and other signals transmitted from the print apparatus 7 via the communication 2. The short-distance wireless adapter does not necessarily comply with Bluetooth and may instead be a wireless LAN (local area network) adaptor or an adapter that employs a proprietary communication protocol defined between the mobile terminal 3 and the print apparatus 7. The communication section 30 is not limited to a wireless adapter and may be a wired communication adapter, and in this case, the communication 2 is performed over a cable or any other component.

The storage section 40 is formed, for example, of a storage device, such as a ROM, a flash ROM, a RAM, a VRAM, an HDD (hard disk drive), and an SSD (solid state drive) and stores a variety of programs, a variety of data, a variety of files, and a variety of other types of information for implementing functional sections of the control section 50. The storage section 40 further has a storage area for display operation, such as a VRAM (video RAM), an editing storage area for editing the label image 101, a work area where data being processed in a variety of processes, values of variables in the processes, results of the processes, and other types of information are temporarily stored, and other areas.

The storage section 40 stores a program 41, screen data 43, object attribute data 45, an object file 47, and other type of information.

The program 41, when it is read and executed by the control section 50, achieves the function of each functional section, such as a display control section 51 and a drawing processing section 53, implemented in the control section 50. The above-mentioned process will be described later in detail by using a flowchart. The program 41 corresponds to a label creation program.

The screen data 43 is formed of GUI (graphical user interface) widgets that form a display screen (such as label editing screen 100) displayed on the display section 10 under the control of the control section 50, information on the arrangement of the widgets on the screen, and other types of data, and the screen data 43 is stored on a display screen basis. Examples of the GUI widgets include a variety of button widgets to be selected in accordance with input operation through the touch panel, a drawing area widget for drawing, for example, an image, a letter area widget for performing letter input and letter display, and other widgets. The display screens and the GUI widgets described above are presented by way of example, and all the display screens and GUI widgets do not need to be essential constituent elements. Further, display screens and GUI widgets different from those described above may be essential constituent elements.

Figure 3:
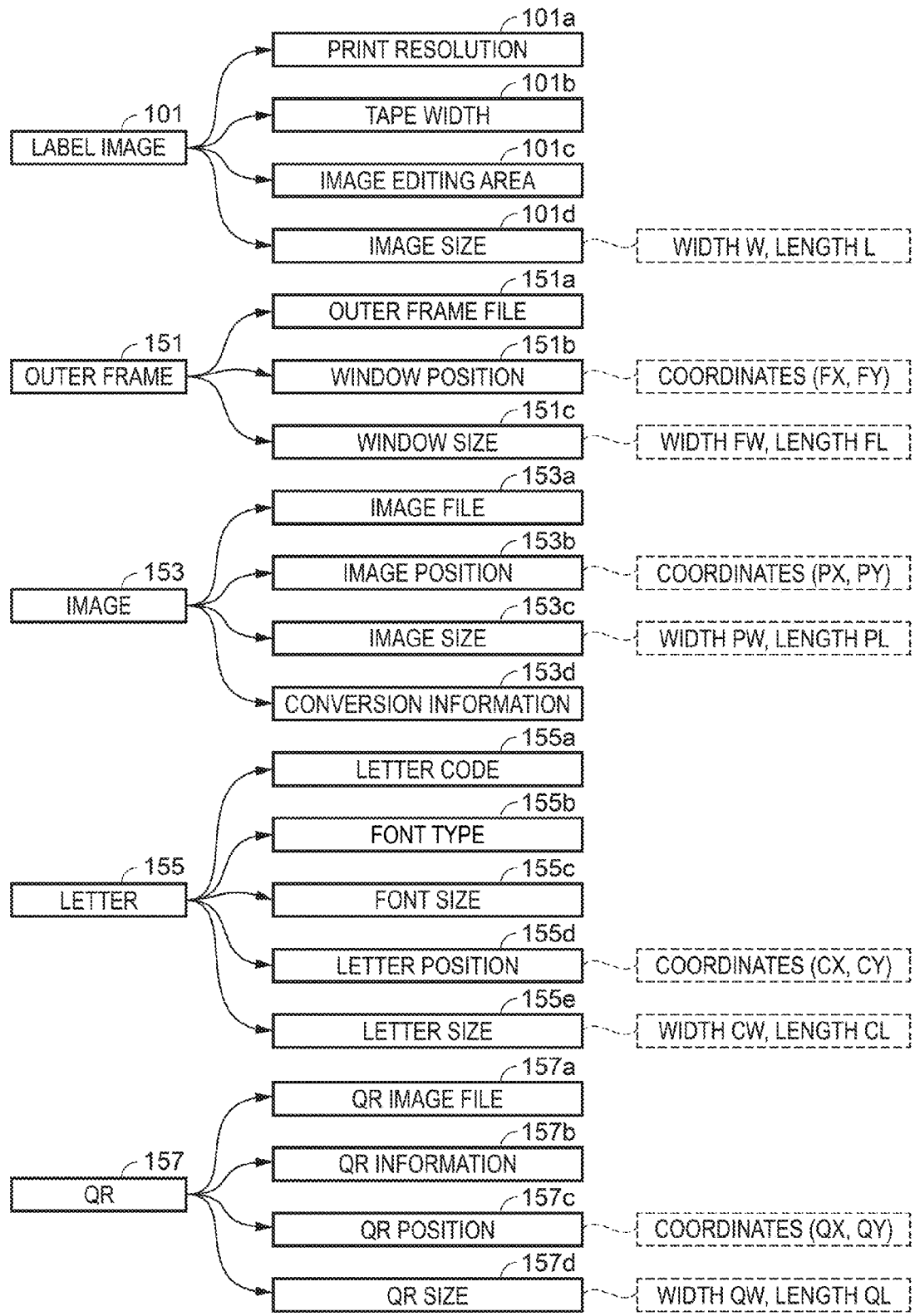
FIG. 3 describes data configurations of a label image and objects.

The object attribute data 45 will next be described with reference to FIG. 3. FIG. 3 describes data configurations of a label image and objects.

The object attribute data 45 stores information associated with the label image 101 and data on an outer frame 151, an image 153, a letter 155, and a QR 157, which are objects arranged in the label image 101. The object attribute data 45 further has the editing storage area (image editing area 101c) for editing the label image 101. When the functional sections of the control section 50, which are described later, perform editing, such as arranging the objects in the label image 101, results of the editing are reflected in the image editing area 101c. Contents of the image editing area 101c are reflected on the storage area for display operation roughly in synchronization with the image editing area 101c and displayed as the label image 101 (FIG. 4) on the label editing screen 100.

As the data on the label image 101, the object attribute data 45 stores information on the label image 101 in general, such as print resolution 101a, a tape width 101b, the image editing area 101c, and an image size 101d.

The print resolution 101a is information on the print resolution of the print apparatus 7. For example, 180 dpi, 360 dpi, and other numerals are stored.

The tape width 101b is information on the width of the tape in the tape cartridge 77 loaded into the print apparatus 7, and the tape width acquired by the print apparatus 7 via the communication section 30 is stored. For example, 12 mm, 18 mm, 24 mm, and 36 mm are stored as the tape width 101b. The tape width may instead be specified by using tape width specification 123 (FIG. 4), which is set in the label editing screen 100, which will be described later.

The image editing area 101c is a work area (editing storage area) for editing the label image 101 (arranging objects in label image 101). The image editing area 101c is a matrix-like area having X and Y coordinates extending in the horizontal and vertical directions of the screen with the upper left corner of the area serving as the origin (0, 0), and data can be accessed (read and written) in an arbitrary position by using the coordinates (X, Y). It is assumed in the following description that in the coordinate system (X, Y), the X-axis direction is the length direction of the tape and the Y-axis direction is the width direction of the tape.

In the image size 101d, information on the width and length (width W and length L) of the image editing area 101c is stored. The width W is the greatest value of the coordinate Y, and the length L is the greatest value of the coordinate X.

The size of the image editing area 101c is preferably determined by using the print resolution 101a at the time of printing. For example, when the tape width is 18 mm and the print resolution 101a is 180 dpi, the width W is preferably set at a size that allows representation of information corresponding to 128 ($\approx$180×18 mm/25.4 mm) dots. Setting the size described above allows the shapes, arrangement, and other factors of the objects edited on the image editing area 101c to be correctly reflected on the label L.

It is further preferable that the size of the image editing area 101c is equal to the size of the display storage area of the label image 101. When the sizes are equal to each other, the content of editing and the content of display are allowed to coincide with each other. Whenever the sizes are not equal to each other, size conversion is performed.

As the data on the outer frame 151, the object attribute data 45 stores information on the outer frame 151, such as an outer frame file 151a, a window position 151b, and a window size 151c. The outer frame file 151a stores, when an outer frame is arranged in the image editing area 101c, the path to a data file of the arranged outer frame and the name of the file. When no outer frame 151 is arranged, the outer frame file 151a stores "NULL," which indicates that no outer frame 151 is present. In the window position 151b, the start position of a window area contained in the data file in the outer frame file 151a is stored in the form of a coordinate value (coordinates (FX, FY)). In the window size 151c, the size of the window area contained in the data file in the outer frame file 151a is stored in the form of information on the width and length (width FW and length FL) from the window position 151b. The data file of an outer frame is, for example, a bitmap-based image data file and has a drawing layer in which an outer frame design is drawn and a transparent layer representing the window area portion. In the drawing layer, dots that form the portion where the frame is drawn are recorded in the form of binary values, grayscale expression from a value of 0 to a value of 127, or full colors. In the transparent layer, in which binary values of 0 and 1 are used, a binary-1-dot area is a transparent area, and a binary-0-dot area is an area where the dots in the drawing layer are drawn. In the binary-1-dot area, which is set to be transparent, objects other than the outer frame 151 are drawn. The area where the dots in the drawing layer are drawn corresponds to a surrounding pattern that surrounds the area transparent to the objects other than the outer frame 151.

As the data on the image 153, the object attribute data 45 stores information on the image 153, such as an image file 153a, an image position 153b, an image size 153c, and conversion information 153d. The image file 153a stores, when an image is arranged in the image editing area 101c, a path to an image file of the arranged image and the name of the file. When no image 153 is arranged, the image file 153a stores "NULL," which indicates that no image 153 is present. In the image position 153b, the start position of the image 153 arranged in the image editing area 101c is stored in the form of information on a coordinate value (coordinates (PX, PY)). In the image size 153c, the size of the image 153 arranged in the image editing area 101c is stored in the form of the width and length (width PW and length PL) from the image position 153b. The conversion information 153d stores information on conversion required when the specified image file 153a is arranged in the image editing area 101c. The conversion is, for example, conversion relating to right or left rotation by 90°, conversion from a full-color image to a monochrome image, conversion from full-color expression to grayscale expression, and conversion relating to enhancement of a contour.

As the data on the letter 155, the object attribute data 45 stores information on the letter 155, such as a letter code 155a, a font type 155b, a font size 155c, a letter position 155d, and a letter size 155e. The letter code 155a stores, when a letter is arranged in the image editing area 101c, a letter code string formed of the arranged letter. In the font type 155b, the font name of the arranged letter 155 or a code that identifies the font name is stored. In the font size 155c, the font size of the arranged letter 155 is stored in the form of the point number. In the letter position 155d, the start position of the letter 155 arranged in the image editing area 101c is stored in the form of information on a coordinate value (coordinates (CX, CY)). In the letter size 155e, the size of a bounding box 105 (FIG. 4) of the arranged letters 155 in the image editing area 101c is stored in the form of the width and length (width CW and length CL) from the letter position 155d. When the arranged letter 155 is a letter string (formed of a plurality of letters), the size of a minimum rectangle including the bounding box 105 of all the letters 155 is calculated and stored in the form of the width CW and the length CL.

As the data on the QR 157, the object attribute data 45 stores information on the QR 157, such as a QR image file 157a, QR information 157b, a QR position 157c, and a QR size 157d. The QR image file 157a stores the path to a file of a QR code converted into image data and the name of the file. When no QR 157 is arranged, the QR image file 157a stores "NULL," which represents no QR 157 is present. The QR information 157b stores a text converted into a QR code, the version number of the converted QR code, and other types of information. The text is, for example, a letter code, such as a URL (uniform resource locator).

In the QR position 157c, the start position of the image data of the QR code arranged in the image editing area 101c is stored in the form of a coordinate value (coordinates (QX, QY)). In the QR size 157d, the size of the image data of the arranged QR 157 including a space margin is stored in the form the width and length (width QW and length QL) from the QR position 157c. In the QR 157, not only the information described above but also a variety of other types of information on the QR code, such as an error correction performance parameter, may be stored.

The description of the storage section 40 (FIG. 2) will be resumed.

The object file 47 is a group of files of selectable objects. Specifically, the object file 47 stores outer frames, images, and other data files. The contents of the object file 47 are not limited to files stored in the storage section 40 and may be a group of data files that can be selected and downloaded, for example, from a website and a content server by connecting the mobile terminal 3 to the Internet. In this case, a file access function of the mobile terminal 3 over a mobile network communication thereof or any other network is used.

The control section 50 is not only a control device but also a computation device that has a processor, such as a CPU or a DSP, and a storage area, such as a RAM, and oversees and controls the constituent portions of the mobile terminal 3 in accordance with programs, such as the program 41 stored in the storage section 40. The control section 50 corresponds to a computer.

The control section 50 has the following functional sections: a display control section 51; a drawing processing section 53; an outer frame specifying section 55; an image specifying section 57; a letter specifying section 59; a QR specifying section 61; and a print processing section 63. These functional sections are presented by way of example and are not necessarily essential constituent components, and other functional sections may be added.

The functional sections will next be described with reference to the drawings but primarily to FIGS. 4 and 5.

FIG. 4 shows an example of the label editing screen displayed on the mobile terminal. FIG. 5 is a function transition diagram showing transition of the functions of the functional sections implemented in the mobile terminal.

First, the function of the display control section 51 is implemented in the control section 50.

The display control section 51 arranges GUI widgets that form the screen data 43 and other data and registers an event process carried out when a GUI widget is selected. As a result, the display section 10 displays the label editing screen 100, and when tough panel operation is performed on a button widget or any other widget arranged on the label editing screen 100, the corresponding functional section is implemented as an event process.

Figure 5:
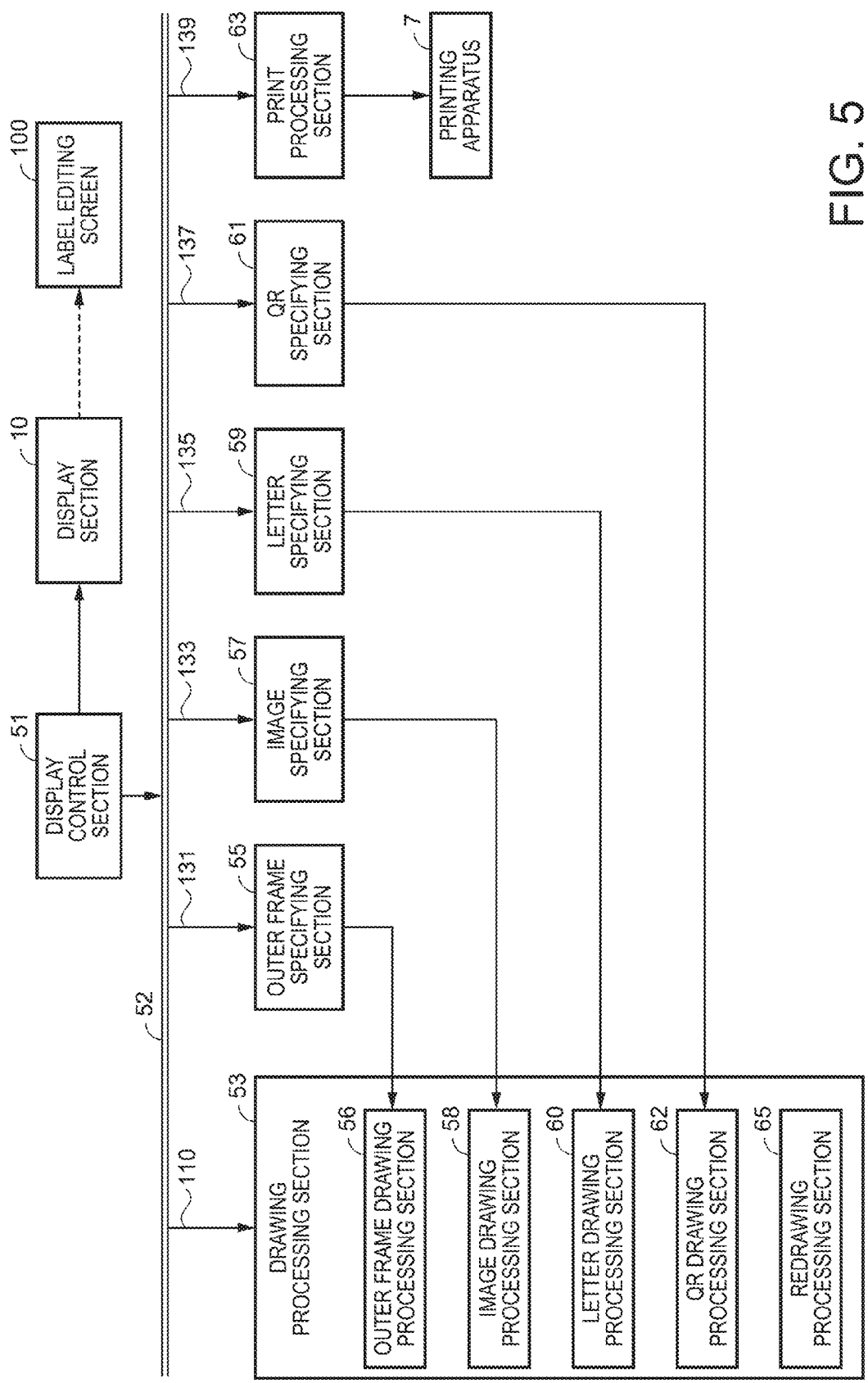
FIG. 5 is a function transition diagram showing transition of the functions of functional sections implemented in the mobile terminal.

When the display control section 51 is implemented, the display section 10 displays the label editing screen 100, and the state in the control section 50 transitions to an event process wait state 52, as shown in FIG. 5. The event process wait state 52 is a state in which the label editing screen 100 is displayed and the control section 50 waits for operation performed by the operator, such as tapping on the touch panel.

The label editing screen 100 will now be described with reference to FIG. 4.

The label editing screen 100 has a screen configuration section formed of a label image display area 110, a label image adjustment area 120, and an object specifying area 130. The label image 101 is displayed in the label image display area 110. This state represents a state in which the data in the image editing area 101c is drawn in the label image display area 110. A label image front end 102 is located at the left end of the label image 101, and an area having an X coordinate close to zero in the image editing area 101c is displayed at the label image front end 102. A label image rear end 103 is located at the right end of the label image 101, and an area having an X coordinate close to L (length) in the image editing area 101c is displayed at the label image rear end 103. FIG. 4 shows an example in which a letter string "Info" is drawn as an object. An arrow cursor 104 is displayed in the start position of the bounding box 105 of the letter string "Info." An input cursor 106 indicates the position of a letter following the letter string "Info" to be inputted.

The label image adjustment area 120 is an area where the position, the size, and other factors of an object temporarily arranged in the label image display area 110 can be adjusted. In the display example, the arranged "letters" are adjustable, and letter size adjustment 121 allows the size of the letters to be set again in the form of the point number. Letter position adjustment 122 allows the start position of the letters to be incremented along the coordinate axes through operation of tapping upward, downward, rightward, and leftward arrow marks.

Tape width specification 123 allows the width of the tape loaded into the print apparatus 7 to be specified again, and tape length specification 124 displays the tape length calculated again in accordance with the tape width specified by the tape width specification 123.

The object specifying area 130 is an area where button widgets for specifying objects to be drawn primarily in the label image 101 are arranged. In the object specifying area 130 are arranged an outer frame button 131, an image button 133, a letter button 135, a QR button 137, and a print button 139.

The outer frame button 131 is a button widget for specifying whether or not an outer frame is arranged and selecting, when an outer frame is arranged, the type of the outer frame. When the outer frame button 131 is tapped, an outer frame specifying screen 132 is displayed. In the outer frame specifying screen 132 are displayed selection buttons 132a, 132b, 132c, 132d, and 132e. The selection button 132a shows "no outer frame," and each of the selection buttons 132b, 132c, 132d, and 132e shows an outer frame image in the form of a reduced image (thumbnail).

The image button 133 is a button widget for specifying an image. When the image button 133 is tapped, an image specifying screen 134 is displayed. The image specifying screen 134 has selection buttons 134a, 134b, 134c, and 134d, and a thumbnail of a selectable image is displayed on the surface of each of the selection buttons.

The letter button 135 is a button widget for specifying a letter. When the letter button 135 is tapped, a letter specifying screen 136 is displayed. The letter specifying screen 136 has a letter input button 136a, a font type button 136b, and a font size button 136c. When the letter input button 136a is tapped, a letter input screen (not shown) is displayed, and an arbitrary letter can be inputted. When the font type button 136b is tapped, a screen where the font type can be selected is displayed, and when the font size button 136c is tapped, a screen where the font size can be specified in the form of a numeral is displayed (neither of the screens is shown).

The QR button 137 is a button widget for specifying a QR code. When the QR 137 is tapped, a QR specifying screen 138 is displayed. The QR specifying screen 138 has a URL input button 138a and a code information button 138b. When the URL input button 138a is tapped, a URL input screen (not shown) is displayed, and when the code information button 138b is tapped, a screen (not shown) where information required when a QR code is created is inputted is displayed.

The print button 139 is a button widget for instructing the print apparatus 7 to print the label image 101.

The drawing processing section 53, the outer frame specifying section 55, the image specifying section 57, the letter specifying section 59, the QR specifying section 61, and the print processing section 63, which are functional sections and implemented as event processes through operation performed on the label editing screen 100, will next be described with reference to FIG. 5.

The drawing processing section 53 is a functional section implemented when operation relating to the label image display area 110 is performed and when redrawing of the label image 101 is required.

The drawing processing section 53 has the following functional sections: an outer frame drawing processing section 56; an image drawing processing section 58; a letter drawing processing section 60; a QR drawing processing section 62; and a redrawing processing section 65.

The outer frame specifying section 55 is implemented when the outer frame button 131 is tapped. The outer frame setting specifying 55 outputs the outer frame specifying screen 132 to the display section 10 and waits for operation of selecting a button in the outer frame specifying screen 132. When any of the selection buttons 132a, 132b, 132c, 132d, and 132e is selected, the selected content is stored in a data storage area of the outer frame file 151a (FIG. 3) associated with the outer frame 151, and the control transitions to the outer frame drawing processing section 56. Specifically, when "no outer frame" is selected, "NULL" is stored in the outer frame file 151a, whereas when an outer frame type is selected, the path to the data file of the outer frame and the name of the file are stored in the outer frame file 151a.

The outer frame specifying section 55 corresponds to a second object specifying section. The procedure of the processes described above and carried out by the outer frame specifying section 55 corresponds to a second object specifying step.

The outer frame drawing processing section 56 acquires, when invoked by the outer frame specifying section 55, the content of the outer frame file 151a. In the case where the outer frame file 151a stores the path to the outer frame and the file name, the outer frame drawing processing section 56 reads the data file of the outer frame and calculates the window position 151b and the window size 151c from the transparent layer. In detail, the outer frame drawing processing section 56 enlarges or reduces the data file of the outer frame in accordance with the size of the image editing area 101c. In the transparent layer in the data file of the outer frame, a maximum rectangle in the area set to be transparent is detected. The upper left corner of the maximum rectangle is stored in the window position 151b as the start position (FX, FY) of the window area. Further, the width and the length of the maximum rectangle are stored in the window size 151c as the width FW and the length FL.

The control then transitions to the redrawing processing section 65 (which will be described later). The redrawing processing section 65 places the outer frame along with other objects in the image editing area 101c and draws them in the label image 101.

In the above description, a maximum rectangle in the area set to be transparent is detected and the start position, the width, and the length are calculated. The rectangle to be detected does not necessarily fall within the area set to be transparent. Instead, a rectangle that overlaps with the outer frame drawing area may be detected, and the start position, the width, and the length of the rectangle may be calculated. Setting the start position, the width, and the length of the thus detected rectangle allows an image and a letter to be drawn in a maximized size in the label image 101 even when the image and/or the letter overlaps with the outer frame.

The image specifying section 57 is implemented when the image button 133 is tapped. The image specifying section 57 outputs the image specifying screen 134 to the display section 10 and waits for operation of selecting a button in the image specifying screen 134. When any of the selection buttons 134a, 134b, 134c, and 134d is selected, the selected content is stored in a data storage area of the image file 153a (FIG. 3) associated with the image 153, and the control transitions to the image drawing processing section 58.

The image drawing processing section 58 acquires, when invoked by the image specifying section 57, the content of the image file 153a. The position and size in accordance with which the image is arranged in the image editing area 101c are then calculated. The position where the image is arranged is calculated from the start position of the image editing area 101c (0, 0), the start position of the window area (FX, FY), or the end position of an object having been already arranged, depending on the presence or absence of an outer frame. The calculated position is stored in the image position 153b. The size of the image is calculated by using the width W of the image size 101d or the width FW of the window size 151c. The calculated size of the image is stored in the image size 153c.

The control then transitions to the redrawing processing section 65, and the image is placed along with other objects in the image editing area 101c and drawn in the label image 101.

The image drawing processing section 58 further carries out a process corresponding to operation performed on the image displayed in the label image display area 110 (for example, adjustment of image position, enlargement or reduction of image size, and deletion of image), and when the image is changed, the image drawing processing section 58 updates the data on the image 153.

The letter specifying section 59 is implemented when the letter button 135 is tapped. The letter specifying section 59 outputs the letter specifying screen 136 to the display section 10 and waits for operation of selecting any of the letter input button 136a, the font type button 136b, the font size button 136c, and other buttons. Letter information inputted by using the function of each of the buttons is stored in a data storage area of the letter 155 (FIG. 3), and the control transitions to the letter drawing processing section 60.

The letter drawing processing section 60 acquires, when invoked by the letter specifying section 59, the contents of the letter code 155*a* and the font type 155*b*. The position and size in accordance with which the letter is arranged in the image editing area 101*c* are then calculated. The position where the letter is arranged is calculated from the start position of the image editing area 101*c* (0, 0), the start position of the window area (FX, FY), or the end position of an object having been already arranged, depending on the presence or absence of an outer frame. The calculated position is stored in the letter position 155*d*. The size of the letter is calculated by using the width W of the image size 101*d* or the width FW of the window size 151*c*. The height of the bounding box 105 of the font of the letter that falls within the width W or the width FW is calculated. The font size equal to the calculated size of the bounding box 105 is determined. The determined font size (point) is stored in the font size 155*c*, and the size of the bounding box 105 is stored in the letter size 155*e*.

The control then transitions to the redrawing processing section 65, and the letter is placed along with other objects in the image editing area 101*c* and drawn in the label image 101. The letter drawing processing section 60 further carries out a process corresponding to operation performed on the letter displayed in the label image display area 110 and on the label image adjustment area 120 (for example, adjustment of letter position, adjustment of letter size, and deletion of letter), and when the letter is changed, the letter drawing processing section 60 updates the data on the letter 155.

The QR specifying section 61 is implemented when the QR button 137 is tapped. The QR specifying section 61 outputs the QR specifying screen 138 to the display section 10 and waits for operation of selecting any of the URL input button 138*a*, the code information button 138*b*, and other buttons. When the URL input button 138*a* and the code information button 138*b* are selected, the URL input screen and the code information input screen are displayed, and a text letter string to be converted, such as a URL, (the text letter string is not limited to a URL) and information required when a QR code is generated are acquired. An image of a QR code is generated in a known QR code generation process on the basis of the acquired information. The image file of the generated QR code is stored in the object file 47, and the path to the image file and the name of the file are stored in the QR image file 157*a*. Further, the converted text letter string, the version number of the generated QR code, and other pieces of information are stored in the QR information 157*b*. The control then transitions to the QR drawing processing section 62.

The QR drawing processing section 62 acquires, when invoked by the QR specifying section 61, information on the QR image file 157*a* and information on the QR information 157*b*. The position and size in accordance with which the image data on the QR code is arranged in the image editing area 101*c* are then calculated. The position where the QR code is arranged is calculated from the start position of the image editing area 101*c* (0, 0), the start position of the window area (FX, FY), or the end position of an object having been already arranged, depending on the presence or absence of an outer frame. The calculated position is stored in the QR position 157*c*. The size of the image is calculated by using the width W of the image size 101*d* or the width FW of the window size 151*c*. The calculated size of the image is stored in the QR size 157*d*. The QR drawing processing section 62 further has a function of comparing the image data in the QR image file 157*a* with the converted image data having the size stored in the QR size 157*d* and, when the two types of data differ from each other by at least a predetermined amount, outputting notification to the display section 10 to notify the operator that it is difficult to read the text letter string.

The QR drawing processing section 62 further carries out a process corresponding to operation performed on the QR code displayed in the label image display area 110 and on the label image adjustment area 120 (for example, adjustment of QR code position, adjustment of QR code size, and deletion of QR code), and when the QR code is changed, the QR drawing processing section 62 updates the data on the QR 157.

The redrawing processing section 65 writes data on the following objects stored in the object attribute data 45 to the image editing area 101*c*: the outer frame 151; the image 153; the letter 155; and the QR 157 and draws the data in the image editing area 101*c* in the label image 101 in the label image display area 110. In detail, the objects are written to the image editing area 101*c* in the following order.

When an outer frame is set, the image 153, the letter 155, and the QR 157 are combined with each other in this order by referring to the start position and the size of each of the image 153, the letter 155, and the QR 157 to form an image in the area set to be transparent in the transparent layer of the outer frame 151. Thereafter, the area set to be nontransparent in the transparent layer of the drawing layer of the outer frame 151 is combined with the image described above in the image editing area 101*c*. The combination is performed by using a typical ROP (raster operation).

When no outer frame is set, the image 153, the letter 155, and the QR 157 are combined with each other in this order by referring to the start position and the size of each of the image 153, the letter 155, and the QR 157 to form an image.

The image specifying section 57, the letter specifying section 59, and the QR specifying section 61 correspond to a first object specifying section. The procedure of the processes described above and carried out by the image specifying section 57, the letter specifying section 59, and the QR specifying section 61 corresponds to a first object specifying step.

The print processing section 63 is implemented when the print button 139 is tapped. The print processing section 63 packetizes the data in the image editing area 101*c* and transmits the packetized data along with a print instruction command (not shown) to the print apparatus 7 via the communication section 30. The print apparatus 7 prints the data in the image editing area 101*c*. After all the data in the image editing area 101*c* are printed, the tape is cut and a label L is created. The print processing section 63 can further transmit a variety of control commands, such as those relating to the number of labels L to be created and whether to cut the tape or keep printing data, to the print apparatus 7.

Drawing Method

Figure 6:
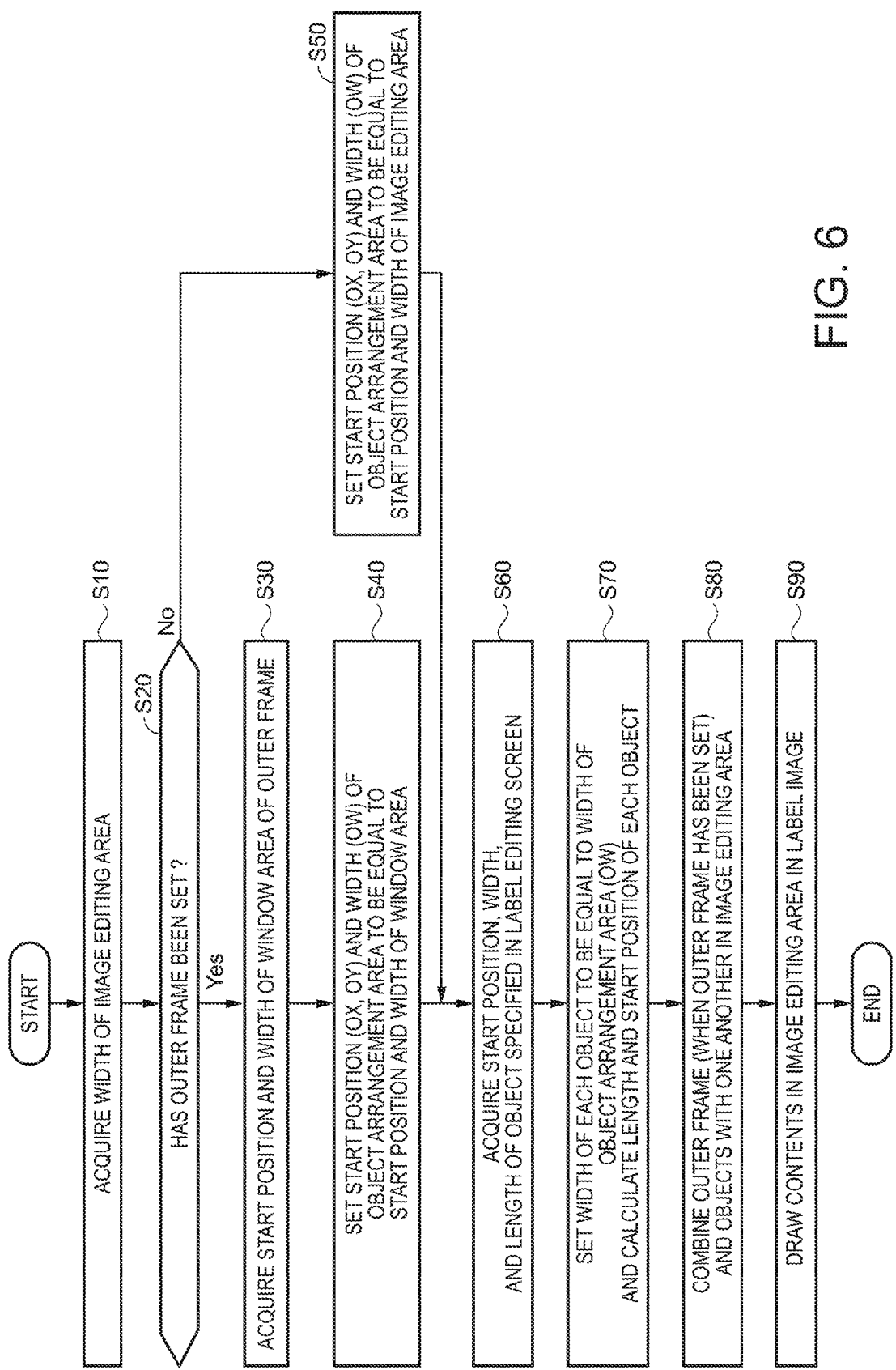
FIG. 6 is a flowchart showing a label image drawing process.
Figure 7:
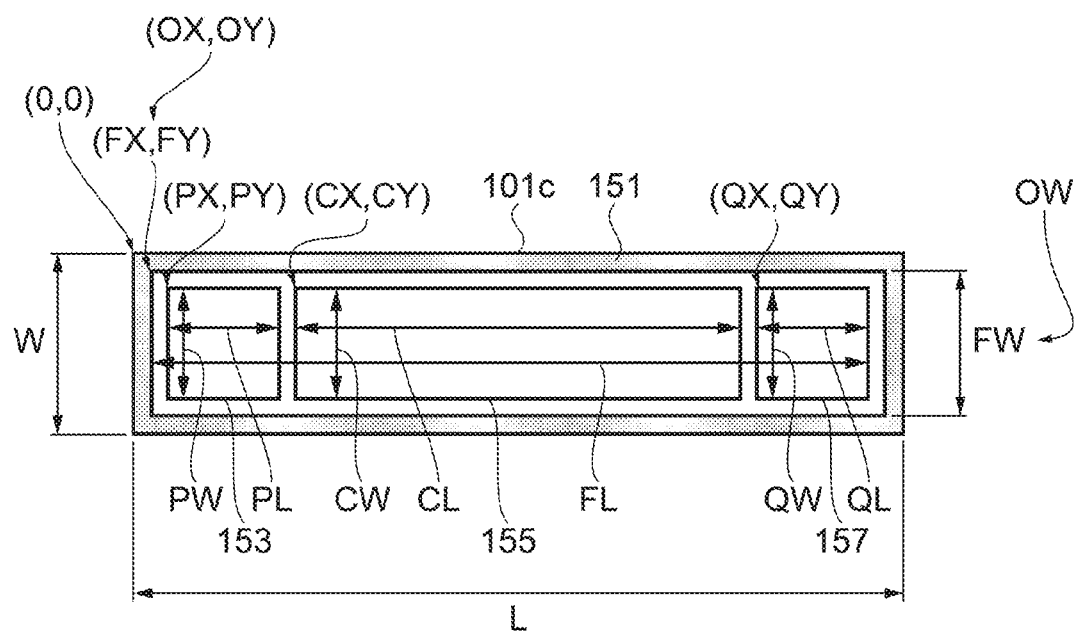
FIG. 7 is a description diagram showing the position and size of an image editing area (with an outer frame set).
Figure 8:
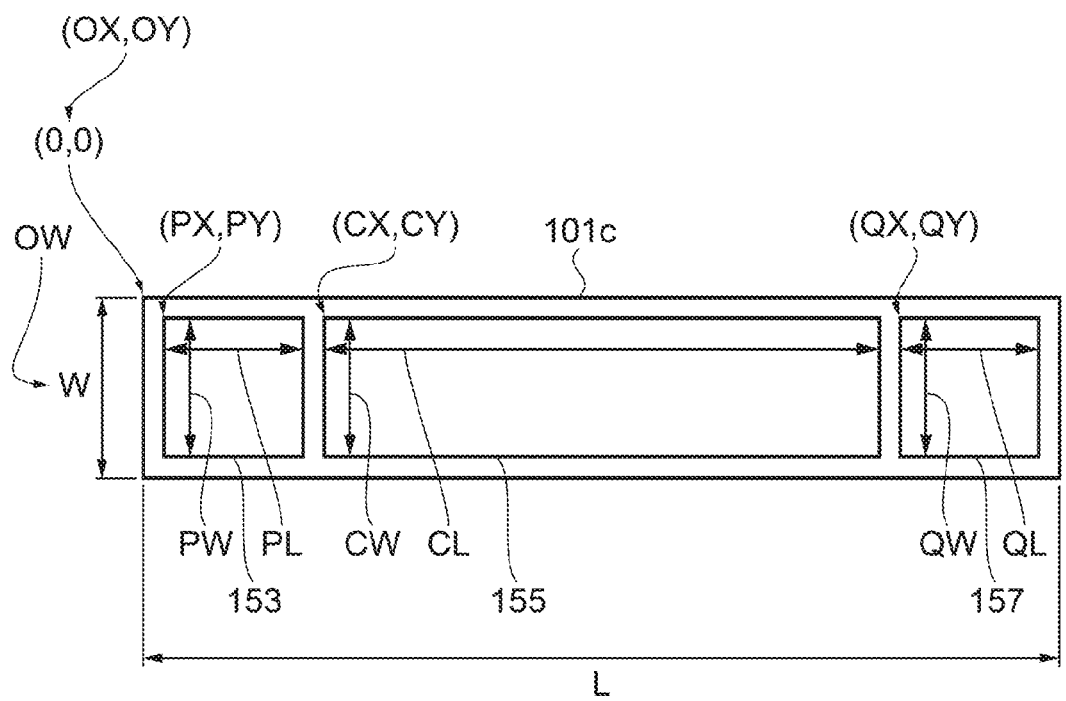
FIG. 8 is a description diagram showing the position and size of the image editing area (with no outer frame set).
Figure 9:
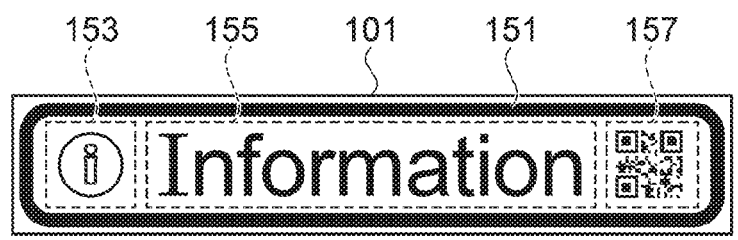
FIG. 9 shows a display example of a label image (with an outer frame set).
Figure 10:
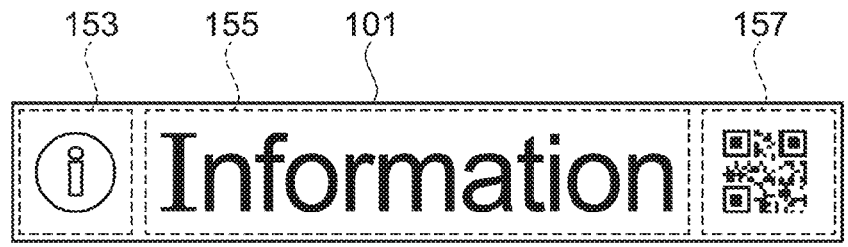
FIG. 10 shows a display example of the label image (with no outer frame set).

A method for drawing a label image will next be described with reference to FIGS. 6 to 10. FIG. 6 is a flowchart showing a label image drawing process. FIG. 7 is a descriptive diagram showing the position and size of the image editing area (with an outer frame set). FIG. 8 is a descriptive diagram showing the position and size of the image editing area (with no outer frame set). FIG. 9 shows a display example of the label image (with an outer frame set). FIG. 10 shows a display example of the label image (with no outer frame set).

The flowchart shown in FIG. 6 shows the procedure of processes implemented when the program 41 stored in the storage section 40 is read and executed by the control section 50.

In step S10, the width of the image editing area 101c is acquired. In detail, the width W is read from the image size 101d (FIG. 3) stored in the storage section 40. The width W has been calculated on the basis of the print resolution 101a and the tape width 101b. The image editing area 101c has a coordinate system having the X coordinate extending in the horizontal direction of the screen and the Y coordinate extending in the vertical direction of the screen with the upper left corner of the area serving as the start position coordinates (0, 0), as shown in FIGS. 7 and 8.

In step S20, whether or not an outer frame has been set is determined. In detail, when any of the selection buttons 132b to 132e has been selected in accordance with the selection contents in the outer frame specifying screen 132, an outer frame has been set (Yes) and the control proceeds to step S30, whereas when the selection button 132a, which corresponds to "no outer frame," has been selected, no outer frame has been set (No) and the control proceeds to step S50.

In step S30, the start position and the width of the window area of the outer frame are acquired. In detail, the start position (FX, FY) and the width (FW) are read from the window position 151b and the window size 151c (FIG. 3). When a new outer frame has been specified, the function of the outer frame drawing processing section 56 is implemented and calculates the start position (FX, FY) and the width (FW) of the new outer frame. FIG. 7 shows the positional relationship between the coordinates (FX, FY) and the width FW.

In step S40, the start position (OX, OY) and the width (OW) of an object arrangement area are set to be equal to the start position and the width of the window area. The start position (FX, FY) and the width (FW) of the window area are substituted into the variable (OX, OY) and the variable OW (see FIG. 7), respectively.

In step S50, the start position (OX, OY) and the width (OW) of the object arrangement area are set to be equal to the start position and the width of the image editing area 101c. The coordinate value (0, 0) is substituted into the coordinate variable (OX, OY), and the width W is substituted into the variable OW, as shown in FIG. 8.

In step S60, the start position, the width, and the length of an object specified in the label editing screen 100 are acquired. The acquired values are stored in the respective variables. When the object is an image, the start position is stored in the variable (PX, PY), the width is stored in the variable PW, and the length is stored in the variable PL. When the object is a letter, the start position is stored in the variable (CX, CY), the width is stored in the variable CW, and the length is stored in the variable CL. When the object is a QR code, the start position is stored in the variable (QX, QY), the width is stored in the variable QW, and the length is stored in the variable QL.

In step S70, the width of each of the objects is set to be equal to the width of the object arrangement area (OW) and the length and the start position of the object are calculated. In detail, the widths of the objects (PW, CW, and QW) are set to be equal to the width OW of the object arrangement area, the lengths and the start positions of the objects are calculated with the aspect ratios of the objects maintained, and the calculated values are stored in the respective variables (PL, CL, QL, PX, PY, CX, CY, QX, and QY). In step S70, the positions and sizes in accordance with which the objects are arranged in the image editing area 101c are determined.

In step S80, the outer frame (when outer frame has been set) and the objects are combined with one another in the image editing area 101c. In FIG. 7, the image 153, the letter 155, and the QR 157, which are the objects excluding the outer frame 151, are arranged and combined with one another inside the area where the outer frame 151 is drawn (latched area). In FIG. 8, the image 153, the letter 155, and the QR 157, which are the objects excluding the outer frame 151, are arranged and combined with one another over the entire area of the image editing area 101c.

In step S90, the contents in the image editing area 101c are drawn in the label image 101. When the image editing area 101c shown in FIG. 7 is drawn in the label image 101, the label image 101 shown in FIG. 9 is displayed. When the image editing area 101c shown in FIG. 8 is drawn in the label image 101, the label image 101 shown in FIG. 10 is displayed.

The position and size of each of the image 153, the letter 155, and the QR 157 to be arranged in the image editing area 101c are thus calculated in accordance with whether or not an outer frame has been set. Each of the objects is drawn in a maximized size in the object arrangement area having the start position (OX, OY) and the width (OW).

The procedure described above corresponds to a drawing step. The first object specifying step, the second object specifying step, and the drawing step form the label creation method.

As described above, the label creation apparatus 1 according to the present embodiment can provide the following advantageous effects.

In the mobile terminal 3, the display control section 51 displays the label editing screen 100 on the display section 10. In the label image display area 110, a variety of objects can be arranged in the label image 101, and a specified object is drawn in the label image 101. In the internal processing performed by the control section 50, the object specified in the image editing area 101c updates the data thereon, and the object is drawn in the label image 101 whenever updates occurs.

In the outer frame specifying screen 132 in the label editing screen 100, the drawing processing section 53 automatically recalculates the size and position of each object both in the case where "no outer frame" (selection button 132a) is selected and the case where "with outer frame" (selection buttons 132b to 132e) is selected. In the case of "no outer frame," the drawing processing section 53 recalculates the size of each object in such a way that the object is enlarged over the entire label image 101 (image editing area 101c) (including outermost area) and determines the position of the object accordingly. In the case of "with outer frame," the drawing processing section 53 recalculates the size of each object in such a way that the object falls within the window area of the outer frame arranged in the label image 101 (image editing area 101c). Since each object is automatically arranged by using the thus recalculated size and position, the operator can, with no effort, arrange each object having a maximized size in the label image 101 in the case of "no outer frame" or can arrange, in the case of "with outer frame," each object arranged inside the outer frame in such a way that the data on the object is not hidden behind the outer frame.

Even when each object is a functional object having an information function, such as letter data, a mark that provides a caution or an alarm, a barcode, and a QR code, the object can be drawn in the label image 101 (image editing area 101c) with the amount of imperfect information on the object reduced. Data in the thus formed label image 101 (image editing area 101c) is transmitted to the print apparatus 7 and printed on a tape. A label L is thus created. In the label L created by the label creation apparatus 1 as described above, a functional object is unlikely to be hidden behind another object, such as a decorative frame and be printed.

The label creation apparatus 1 provided by the present embodiment therefore allows a functional object to be readily arranged with possibility of imperfection of information contained in the functional object lowered.

Second Embodiment

A second embodiment will next be described with reference primarily to FIGS. 11 to 13 in conjunction with other figures.

Figure 11:
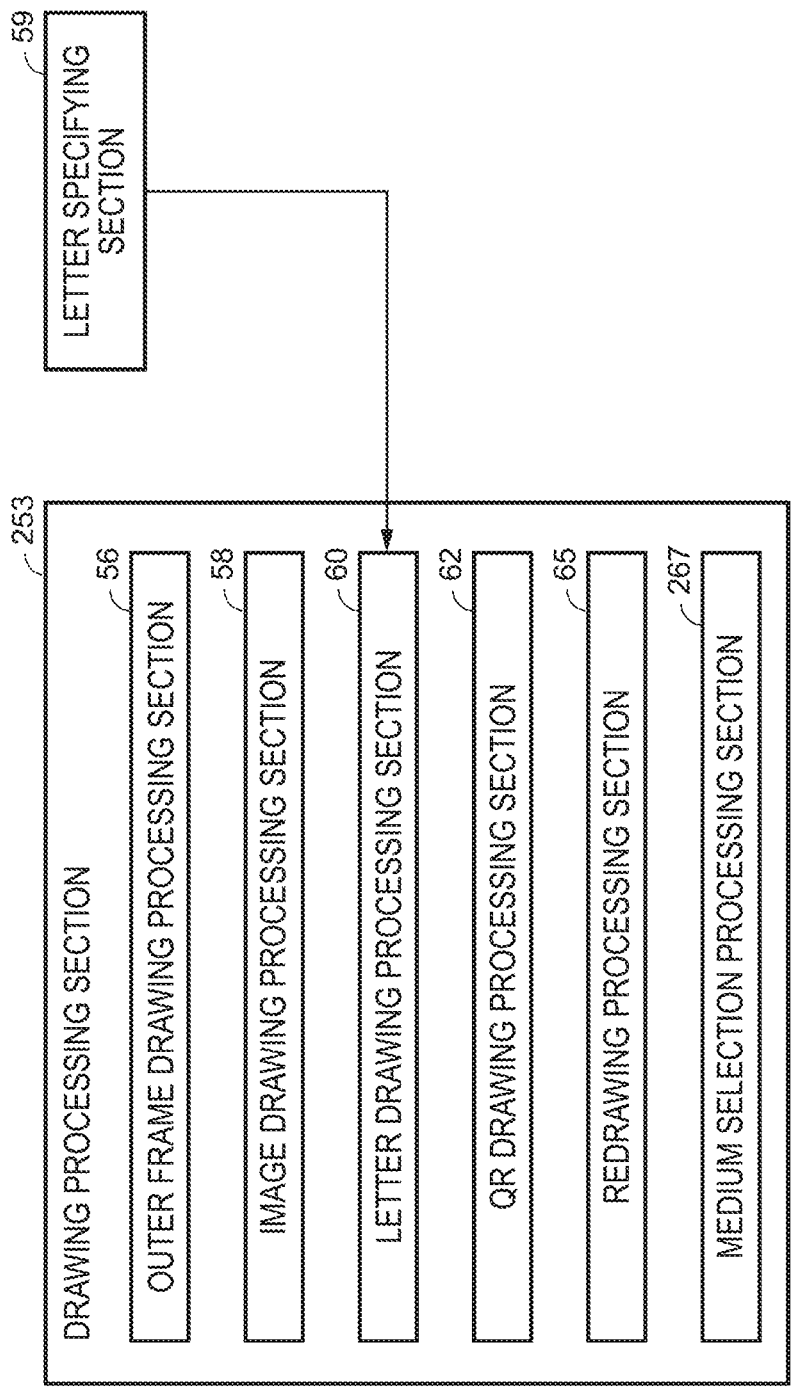
FIG. 11 is a block diagram schematically showing the configuration of a drawing processing section in a second embodiment.

FIG. 11 is a block diagram schematically showing the configuration of a drawing processing section in the second embodiment. FIG. 12 shows a display example of a label image and a medium change guide screen in the second embodiment. FIG. 13 is a flowchart for describing a medium selection process in the second embodiment. In the first embodiment, an object is arranged in the area of the label image 101, as shown in FIGS. 9 and 10, and the present embodiment differs from the first embodiment in that an object can be so arranged as to extend off the area of the label image 101, as shown in FIG. 12. The present embodiment will be described below primarily about points different from the first embodiment. The same configurations and functions as those in the first embodiment will not be described.

A drawing processing section 253 is formed of the drawing processing section 53 shown in FIG. 5 to which a medium selection processing section 267 is further added.

When the size or the position of an object is changed, the medium selection processing section 267 operates in such a way that when there is a medium having a tape width appropriate for the change, the medium selection processing section 267 notifies the operator of the medium having an appropriate tape width in place of a medium having a specified tape width. Specifically, the medium selection processing section 267 displays a tape width change selection screen 180 (FIG. 12).

The function of the medium selection processing section 267 will be described below with reference to a case where the letter 155 as an object is changed. The same process can be carried out when an object other than the letter 155 is changed.

The medium selection processing section 267 acquires the position and size of the letter 155 changed by the letter specifying section 59 and evaluates, on the basis of the specified tape width 101b and the print resolution 101a, whether the changed letter 155 can be drawn within the image editing area 101c. Only when a result of the evaluation shows that the changed letter 155 cannot be drawn within the area (the letter 155 extends off the image editing area 101c), the tape width that allows the letter 155 to be drawn within the area is calculated, and a medium having the calculated tape width is selected. A text that suggests the operator to replace the current medium with a medium having the selected tape width and perform printing with the replaced medium is displayed.

When the operator chooses to change the tape width as a result of the suggestion, the information on the tape cartridge 77 loaded into the print apparatus 7 is received via the communication section 30. When the width of the tape in the tape cartridge 77 is equal to the selected tape width, the tape width is stored in the tape width 101b. Thereafter, when the control transitions to the redrawing processing section 65, the letter 155 is so arranged as to fall within the area of the label image 101 and displayed.

Figure 12:
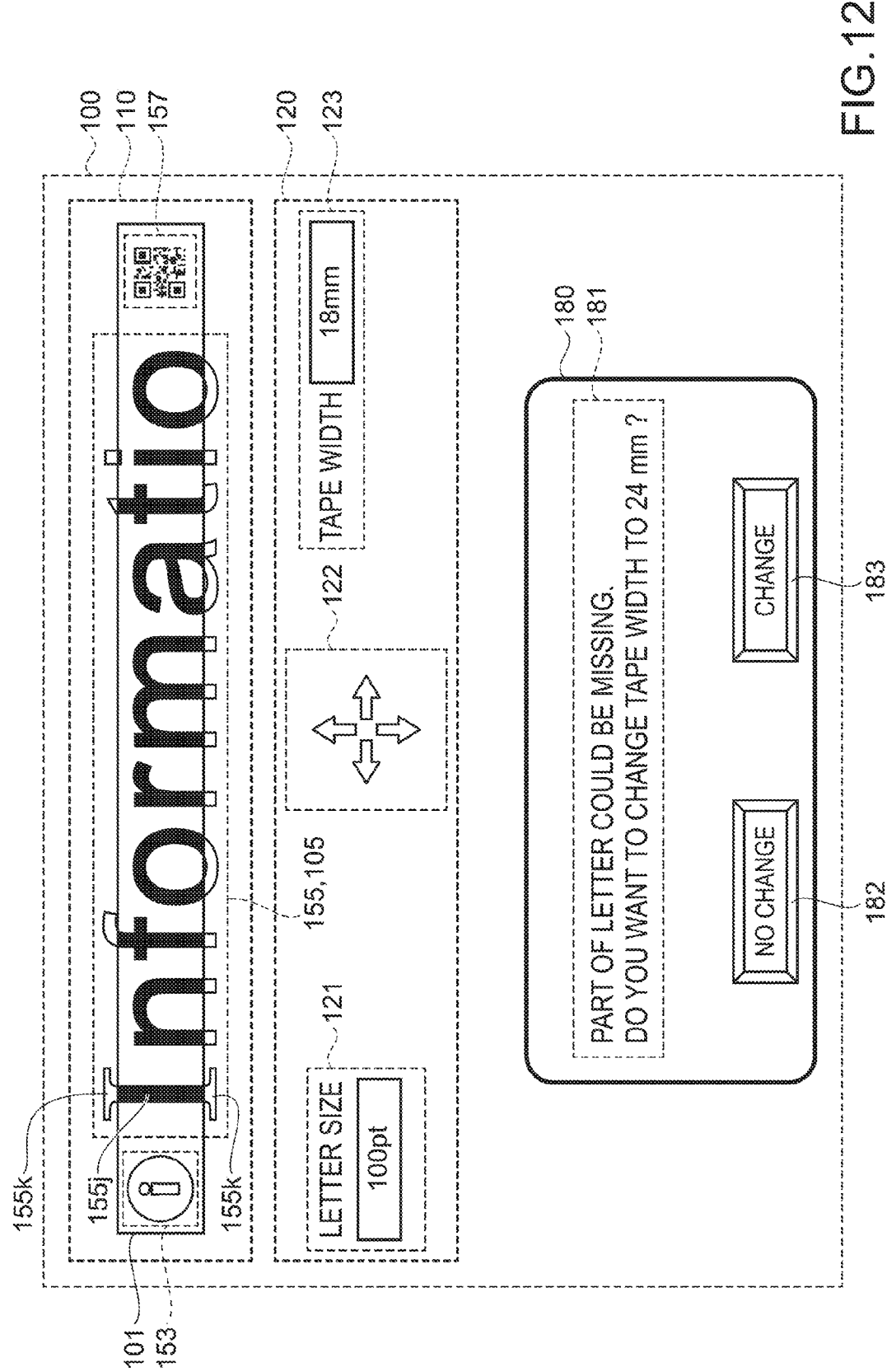
FIG. 12 shows a display example of a label image and a medium change guide screen in the second embodiment.

In the label editing screen 100 shown in FIG. 12, only a portion that relates to the description of the present embodiment is shown, and portions that do not directly relate to the description are omitted. The omitted portions have the same configurations as those in the label editing screen 100 shown in FIG. 4.

The label image 101 is displayed in the label image display area 110. The image 153, the letter 155, and the QR 157, which are objects, are arranged in the label image 101. The letter size adjustment 121, the letter position adjustment 122, and the tape width specification 123 are displayed in the label image adjustment area 120. In the letter size adjustment 121, the letter size is set at "100 pt," and in the tape width specification 123, the tape width is set at "18 mm."

A tape width change selection screen 180, which shows a tape width change candidate and prompts the operator to choose whether or not the tape width is changed, is displayed in a lower portion and in front of the label editing screen 100. The tape width change selection screen 180 has a confirmation information display area 181, a button 182 having a text "no change" displayed on the top of the button, and a button 183 having a text "change" displayed on the top of the button. In the confirmation information display area 181, a text "Part of letter could be missing. Do you want to change tape width to 24 mm?" is displayed. The term "24 mm" in the text is the tape width candidate and corresponds to a candidate of the size of the medium.

The bounding box 105 of the letter 155 arranged in the label image 101 is arranged in an area wider in the tape width direction than the area where the label image 101 is displayed. The portion of the letter 155 that falls within the area of the label image 101 is displayed in black, and the portion of the letter 155 that extends off the area of the label image 101 is displayed in the form of open letters. For example, look at "I" of the "Information" by way of example. A letter portion 155j is the portion that falls within the area of the label image 101, and letter portions 155k are the portion that extends off the area of the label image 101.

The state in which the letter portions 155k are present occurs, for example, when the drawing processing section 253 sets the letter size at 65 pt, which allows the letter 155 to fall within the area of the label image 101, and then the letter size is changed to 100 pt by using the letter size adjustment 121. The following text is then displayed in the confirmation information display area 181: Changing the set tape width from "18 mm" to "24 mm" broadens the tape-width-direction area and therefore allows the letter 155 to fall within the area of the label image 101. The situation in which the letter 155 is so arranged to extend off the area of the label image 101 occurs not only in the case where the letter size is changed by using the letter size adjustment 121 but also in a case where the letter position is changed by using the letter position adjustment 122.

As described above, in a case where the size and position of an object are changed in the label editing screen 100, implementing the medium selection processing section 267, the drawing processing section 253, and other functional sections allows selection of an appropriate tape width and notification of the selected tape width.

In the first embodiment, the image editing area 101c coincides with the area of the displayed label image 101, whereas in the present embodiment, to achieve the feature thereof, the image editing area 101c is set to be wider (including open letter portions 155k) than the displayed label image 101.

Figure 13:
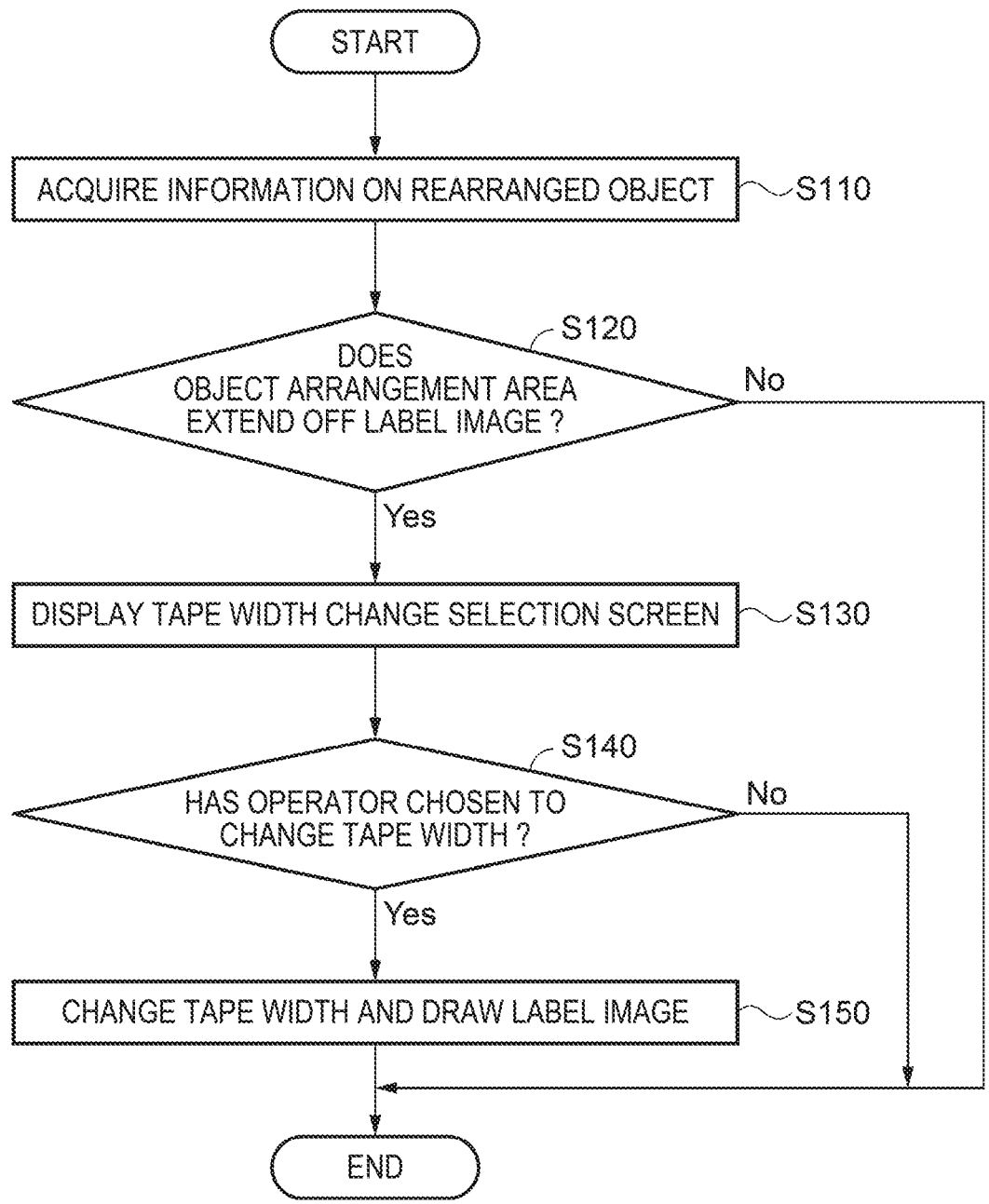
FIG. 13 is a flowchart for describing a medium selection process in the second embodiment.

The flowchart shown in FIG. 13 is a flowchart showing the procedure of a medium selection process in the second embodiment.

The medium selection process is a process implemented by the medium selection processing section 267 provided in the drawing processing section 253 under the control of the control section 50. The flowchart starts when an object is temporarily automatically arranged in the area of the label image 101 and then the object is rearranged in the event process wait state 52 (FIG. 5).

In step S110, information on the rearranged object is acquired. In detail, the position and size of the object rearranged by operation performed on the label image adjustment area 120 are acquired. The rearranged object is displayed in the label image 101.

In step S120, it is evaluated whether or not the object arrangement area extends off the label image 101. When a result of the evaluation shows that the object arrangement area extends off the label image 101 (Yes), the control proceeds to step S130, whereas when a result of the evaluation shows that the object arrangement area does not extend off the label image 101 (No), the control proceeds to END of the flowchart.

In step S130, the tape width change selection screen 180 is displayed. In detail, information on the width of each tape that can be loaded into the print apparatus 7 is acquired. The print resolution 101a is used to calculate the size (the number of dots in each of the horizontal and vertical directions) of a printable area for each of the acquired tape widths. The object arrangement area is compared with the printable areas to determine a tape width having a minimum printable area where the object can be arranged, and a text that recommends the tape width (recommended tape width) is displayed in the confirmation information display area 181.

In step S140, it is evaluated whether or not the operator has chosen to change the tape width. When the button 183, which is pressed when the operator has chosen to change the tape width, has been selected (Yes), the control proceeds to step S150, whereas when the button 182, which is pressed when the operator has chosen not to change the tape width, has been selected (No), the control proceeds to END of the flowchart.

In step S150, the tape width is changed, and the resultant label image 101 is displayed. In the displayed label image 101, the tape width has been changed to the recommended tape width.

When the flowchart is completed, the control transitions to the event process wait state 52.

According to the present embodiment described above, when a functional object, such as the letter 155, is so arranged as to extend off the area of the label image 101, the drawing processing section 253 and the medium selection processing section 267 select a tape width 101b that allows the functional object to fall within the area of the label image 101 and display the tape width change selection screen 180. The operator can obtain information on a tape on which the arranged functional object can be reliably printed and replace the current tape cartridge 77 with a tape cartridge 77 accommodating a tape having the tape width displayed in the confirmation information display area 181 for printing. The functional object so arranged as to extend off the area of the label image 101 can thus be reliably printed with no omission of information contained in the functional object.

Third Embodiment

A third embodiment will next be described with reference primarily to FIGS. 14 to 17 in conjunction with other figures.

Figure 14:
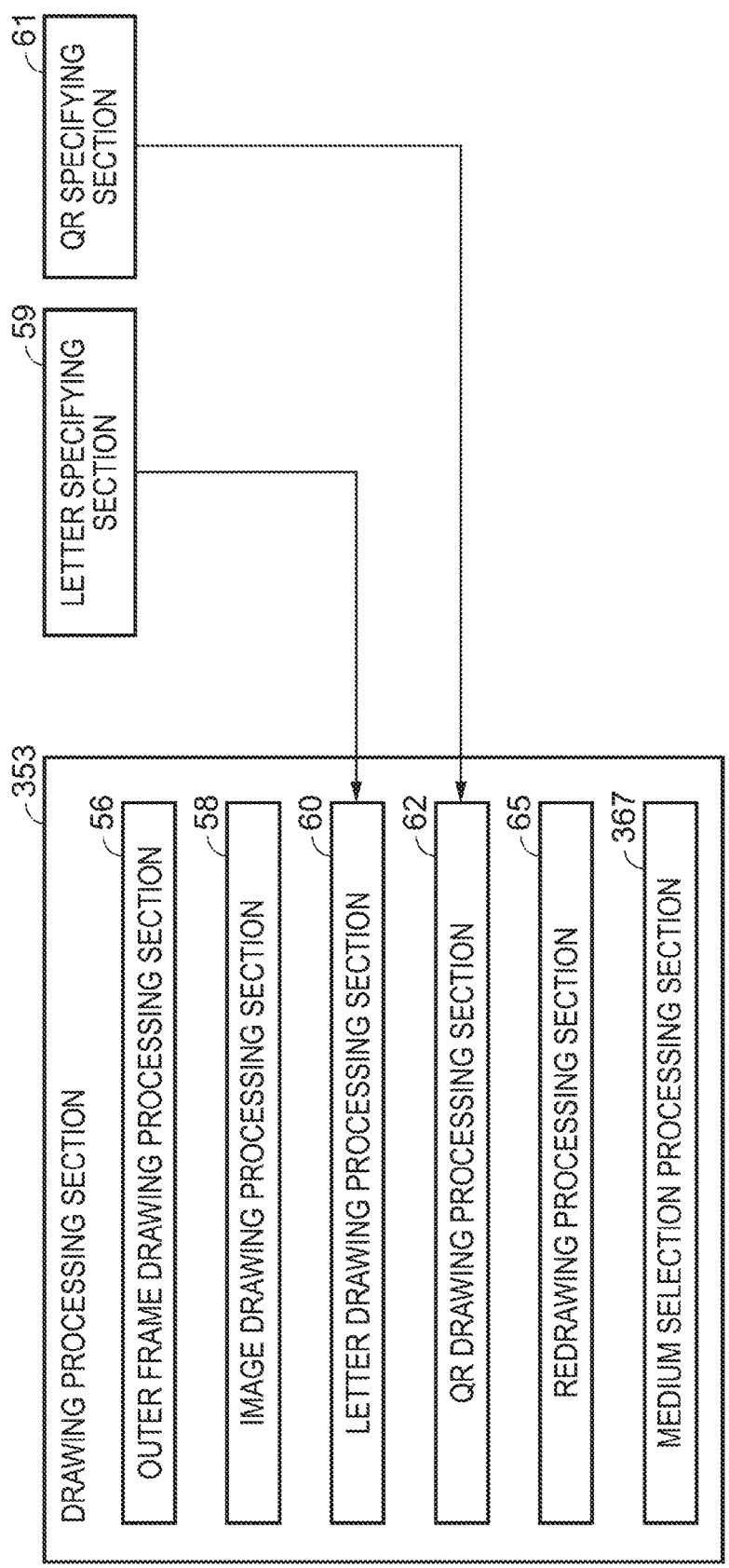
FIG. 14 is a block diagram schematically showing the configuration of a drawing processing section in a third embodiment.
Figure 15:
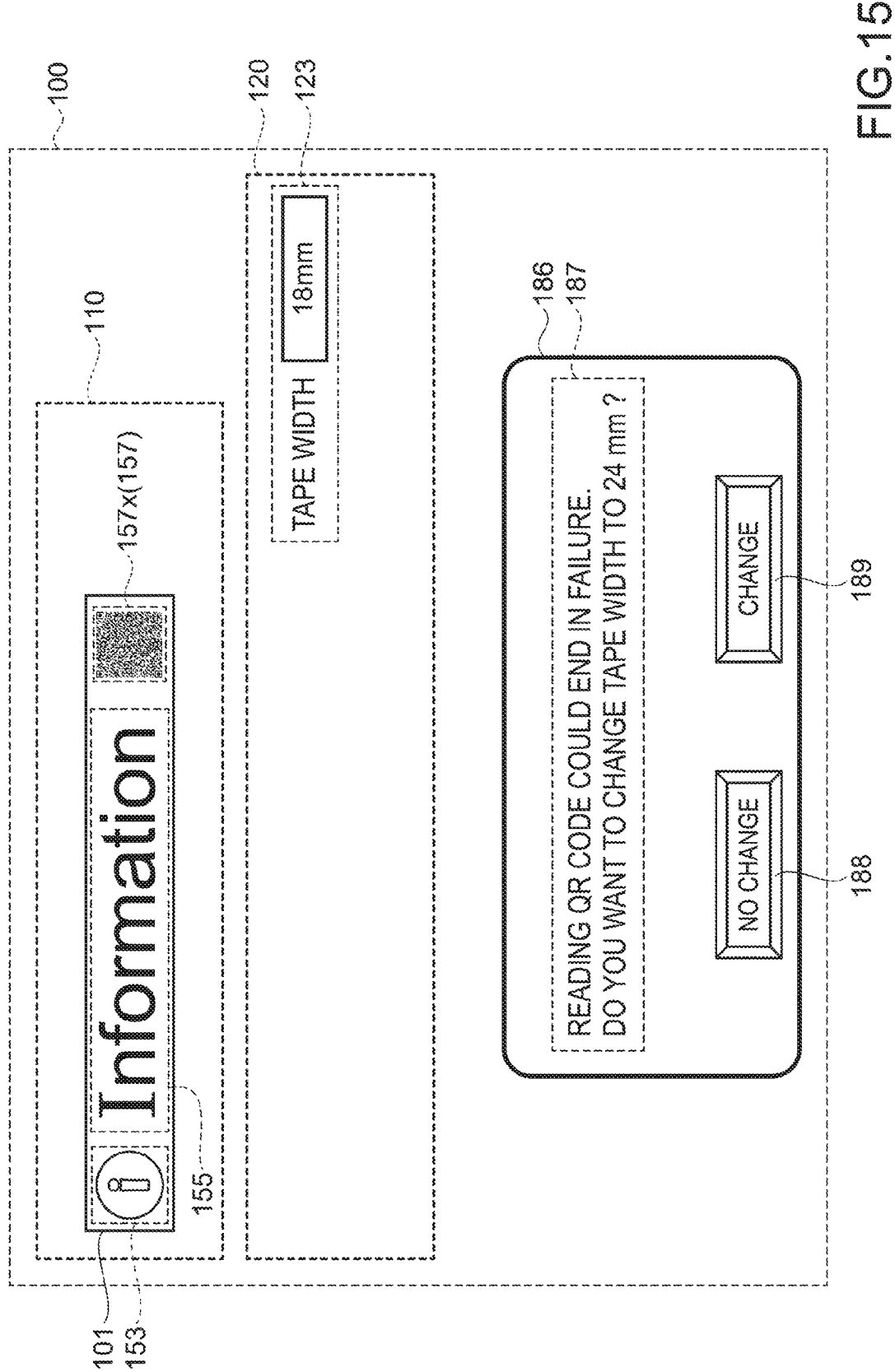
FIG. 15 shows a display example of a label image and a medium change guide screen in the third embodiment.
Figure 16:
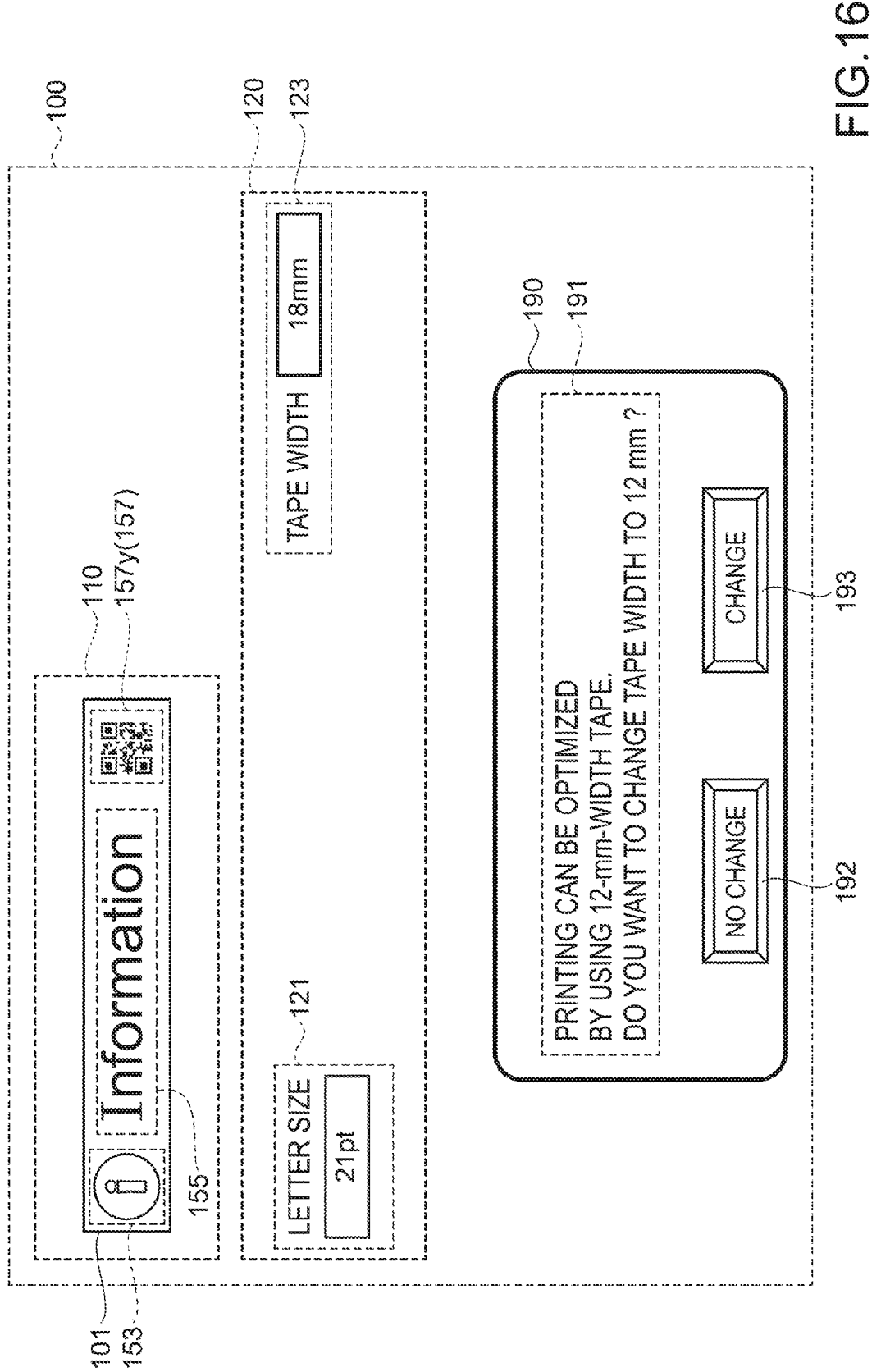
FIG. 16 shows another display example of the label image and the medium change guide screen in the third embodiment.
Figure 17:
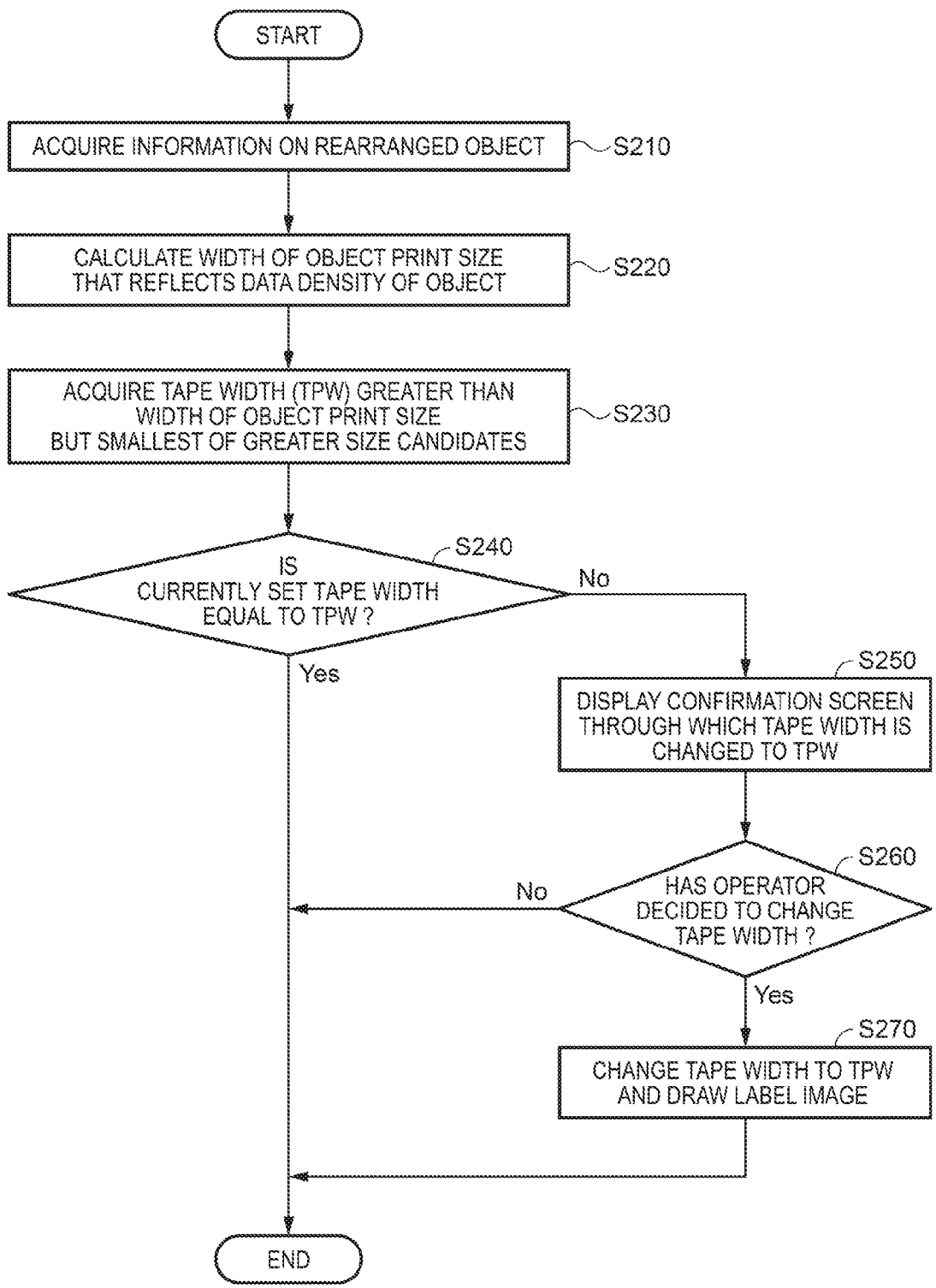
FIG. 17 is a flowchart for describing a medium selection process in the third embodiment.

FIG. 14 is a block diagram schematically showing the configuration of a drawing processing section in the third embodiment. FIGS. 15 and 16 show display examples of a label image and a medium change guide screen in the third embodiment. FIG. 17 is a flowchart for describing a medium selection process in the third embodiment.

In the second embodiment described above, a tape width change candidate is selected on the basis of the position and size in accordance with which a functional object is arranged, and the present embodiment differs from the second embodiment in that a tape width change candidate is selected on the basis of the data density of a functional object. The present embodiment will be described below primarily about points different from the second embodiment. The same configurations and functions as those in the embodiments described above will not be described.

A drawing processing section 353 has a configuration in which the medium selection processing section 267 in the drawing processing section 253 is replaced with a medium selection processing section 367. The drawing processing section 353 may instead have a configuration in which the medium selection processing section 367 is provided in addition to the medium selection processing section 267.

The medium selection processing section 367 evaluates whether there is a medium having a tape width that is appropriate for the data density of a functional object and replaces a medium having a specified tape width, and when a result of the evaluation shows that there is such a medium, the medium selection processing section 367 notifies the operator of the medium having an appropriate tape width. Specifically, in a case where the operator is prompted to use a greater tape width, a tape width change selection screen 186 (FIG. 15) is displayed, and in a case where the operator is prompted to use a smaller tape width, a tape width change selection screen 190 (FIG. 16) is displayed. The following description will be made with reference to a case where a QR code shown as the QR 157 (QR 157x, QR 157y) is specified as a functional object. The same process can be carried out when a functional object other than the QR code is changed.

The medium selection processing section 367 acquires the data density of a QR code generated by the QR specifying section 61 and calculates, in accordance with whether the degree of the data density, a size (object print size) that prevents imperfect information in the QR code. A tape width greater than the calculated object print size but smallest of greater width candidates is selected. A text that suggests the operator to replace the current medium with a medium having the selected tape width and perform printing with the replaced medium is displayed. When the operator chooses to change the tape width as a result of the text, the information on the tape cartridge 77 loaded into the print apparatus 7 is received via the communication section 30. When the width of the tape in the tape cartridge 77 is equal to the selected tape width, the tape width is stored in the tape width 101b. Thereafter, when the control transitions to the redrawing processing section 65, the QR 157 is arranged in the label image 101 and displayed.

The calculation of the object print size performed by the medium selection processing section 367 will be described with reference to a specific example.

For example, in a case of a QR code having a relatively high data density among a variety of QR codes, the operator is prompted to use a relatively wide tape width. A QR code of a version number 12 has information having a data density of 65×65 (cells) in the vertical and horizontal directions. For example, when the QR code is printed at 5 dots/cell and by setting the print resolution of the print apparatus 7 at 360 dpi, the object print size is calculated as follows: The length thereof is about 0.903 (inch)=5 (dots)× 65 (cells)÷360 (dpi) or about 23 (mm). That is, in this example, the tape width of 18 mm is smaller than required, and a tape width of 24 mm is required.

For example, in a case of a QR code having a relatively low data density among a variety of QR codes, the operator is notified that a large tape width is not required. A QR code of a version number 1 has information having a data density of 21×21 (cells) in the vertical and horizontal directions. For example, when the QR code is printed at 4 dots/cell and by setting the print resolution of the print apparatus 7 at 180 dpi, the object print size is calculated as follows: The length thereof is about 0.47 (inch)=4 (dots)×21 (cells)÷180 (dpi) or about 11.86 (mm). That is, in this example, the tape width of 18 mm results in a large blank area, and a tape width of 12 mm suffices.

The label editing screen 100 shown in FIG. 15 is a display screen in the above-mentioned case where a QR code having a relatively high data density among a variety of QR codes is specified. The following description will be made of the case where the print resolution of the print apparatus 7 is set as 360 dpi.

The label image 101 is displayed in the label image display area 110. The image 153, the letter 155, and the QR 157*x* as the QR 157, which are objects, are arranged in the label image 101. In the label image adjustment area 120, "18 mm" is specified and displayed in the tape width specification 123.

The tape width change selection screen 186, which shows a tape width change candidate and prompts the operator to choose whether or not the tape width is changed, is displayed in a lower portion and in front of the label editing screen 100. The tape width change selection screen 186 has a confirmation information display area 187, a button 188 having a text "no change" displayed on the top of the button, and a button 189 having a text "change" displayed on the top of the button. In the confirmation information display area 187, a text "Reading QR code could end in failure. Do you want to change tape width to 24 mm?" is displayed. The term "24 mm" in the text is the tape width candidate and corresponds to a candidate of the size of the medium.

The QR 157*x* is a QR code of the version number 12, and when the print resolution is 360 dpi, the tape width of 18 mm is smaller than required, and the tape width of 24 mm is required. Therefore, the confirmation information display area 187 is displayed and recommends changing the tape width to 24 mm.

The label editing screen 100 shown in FIG. 16 is a display screen in the above-mentioned case where a QR code having a relatively low data density among a variety of QR codes is specified. The following description will be made of the case where the print resolution of the print apparatus 7 is set as 180 dpi The label image 101 is displayed in the label image display area 110. The image 153, the letter 155, and the QR 157*y* as the QR 157, which are objects, are arranged in the label image 101. In the label image adjustment area 120, the letter size adjustment 121 and the tape width specification 123 are displayed. In the letter size adjustment 121, the letter size is set at "21 pt," and in the tape width specification 123, the tape width is set at "18 mm."

The tape width change selection screen 190, which shows a tape width change candidate and prompts the operator to choose whether or not the tape width is changed, is displayed in a lower portion and in front of the label editing screen 100. The tape width change selection screen 190 has a confirmation information display area 191, a button 192 having a text "no change" displayed on the top of the button, and a button 193 having a text "change" displayed on the top of the button. In the confirmation information display area 191, a text "Printing can be optimized by using 12-mm-width tape. Do you want to change tape width to 12 mm?" is displayed. The term "12 mm" in the text is the tape width candidate and corresponds to a candidate of the size of the medium.

The QR 157*y* is a QR code of the version number 1, and when the print resolution is 180 dpi, the tape width of 18 mm is too large, and the tape width of 12 mm suffices. Further, the letter size has been changed to 21 pt, which is a relatively small size, by using the letter size adjustment 121. In view of the circumstances described above, the confirmation information display area 191 is displayed and recommends changing the tape width to 12 mm.

The flowchart shown in FIG. 17 is a flowchart showing the procedure of a medium selection process in the third embodiment.

The medium section process is a process implemented by the medium selection processing section 367 provided in the drawing processing section 353 under the control of the control section 50. The flowchart starts when an object is temporarily automatically arranged in the area of the label image 101 and then the object is rearranged in the event process wait state 52 (FIG. 5).

In step S210, information on the rearranged object is acquired. In detail, the position and size of the object rearranged by operation performed on the label image adjustment area 120 are acquired. The rearranged object is displayed in the label image 101.

In step S220, the width of the object print size that reflects the data density of the object is calculated. Instep S230, a tape width greater than the width of the object print size but smallest of greater width candidates is acquired. The acquired tape width is called a value TPW. In S240, it is evaluated whether or not the currently set tape width 101*b* is equal to TPW. When a result of the evaluation shows that they are equal to each other (Yes), the procedure of the flowchart is terminated, whereas when a result of the evaluation shows that they are not equal to each other (No), the control proceeds to step S250. In step S250, a confirmation screen that recommends changing the tape width to TPW is displayed. In step S260, it is evaluated whether or not the operator has decided to change the tape width. When a result of the evaluation shows that the operator has decided to change the tape width (Yes), the control proceeds to step S270, whereas when a result of the evaluation shows that the operator has decided not to change the tape width (No), the procedure of the flowchart is terminated. In step S270, the tape width is changed to TPW, and the label image 101 is displayed.

When the procedure of the flowchart is completed, the control transitions to the event process wait state 52.

According to the present embodiment described above, the drawing processing section 353 and the medium selection processing section 367 calculate, in accordance with the degree of the data density of a functional object, for example, the QR 157, an object print size that prevents imperfect information in the functional object. A tape width greater than the object print size but smallest of greater width candidates is then selected.

A label L created by performing printing on a medium having the selected tape width has information contained in the functional object printed with no omission. Further, since the functional object is printed on the medium having a size that prevents omission of the information but is a minimum tape width, a label L having a small blank area and other useless areas on the medium can be created.

The invention is not limited to the embodiments described above, and a variety of changes, improvements, and other modifications can be made to the embodiments described above. Variations will be described below.

Variation 1

Figure 18:
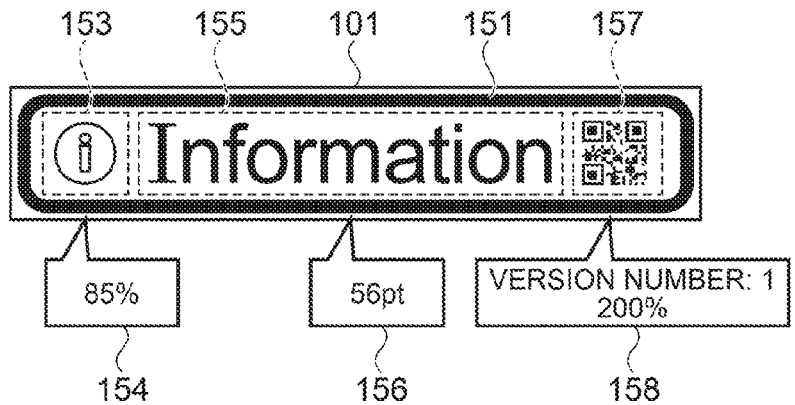
FIG. 18 shows a display example of a label image (with outer frame set) in a variation.

Variation 1 will be described with reference to FIGS. 18 and 19. FIG. 18 shows a display example of a label image in the variation (with outer frame set), and FIG. 19 shows another display example of a label image in the variation (with no outer frame set).

The above embodiments have been described assuming that the drawing processing section 53 displays the label image 101 in the label image display area 110 in the label editing screen 100 (FIG. 4), and the drawing processing section 53 may further display additional information on an object.

Figure 19:
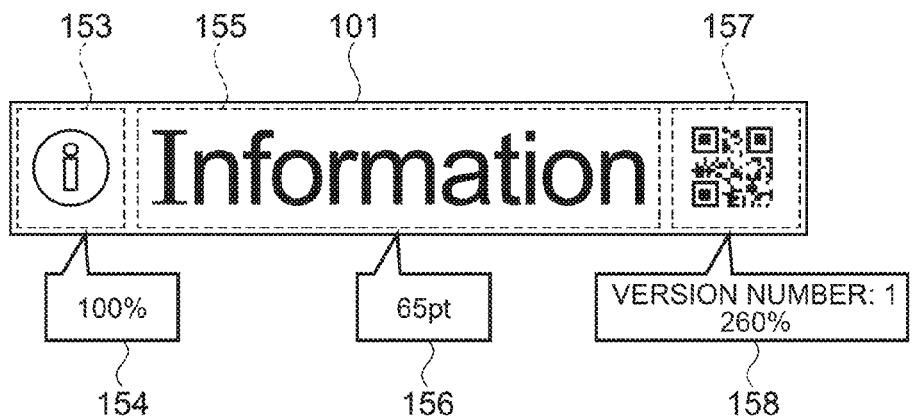
FIG. 19 shows another display example of the label image (with no outer frame set) in the variation.

Information on the image 153 is displayed in image supplementary information 154, information on the letter 155 is displayed in letter supplementary information 156, and information on the QR 157 is displayed in QR supplementary information 158, with each of the pieces of information displayed in a balloon mark, as shown in FIGS. 18 and 19.

In the image supplementary information 154, a numeral representing an enlargement/reduction factor (%) at which image data is enlarged or reduced is displayed. In the letter supplementary information 156, the point number of the letter font is displayed. In the QR supplementary information 158, the version number of the QR code and an enlargement/reduction factor at which the QR data is enlarged or reduced are displayed.

Since the outer frame 151 is set in FIG. 18, and no outer frame is set in FIG. 19, the drawing processing section 53 draws the objects in such away that the size of the objects in FIG. 19 is greater than the size of the objects in FIG. 18.

Displaying information, such as the size of an object, in the form of a numeral or a letter as described above allows the operator to be readily notified of differences in the objects between the case where an outer frame is set and the case where no outer frame is set.

Variation 2

Figure 20:
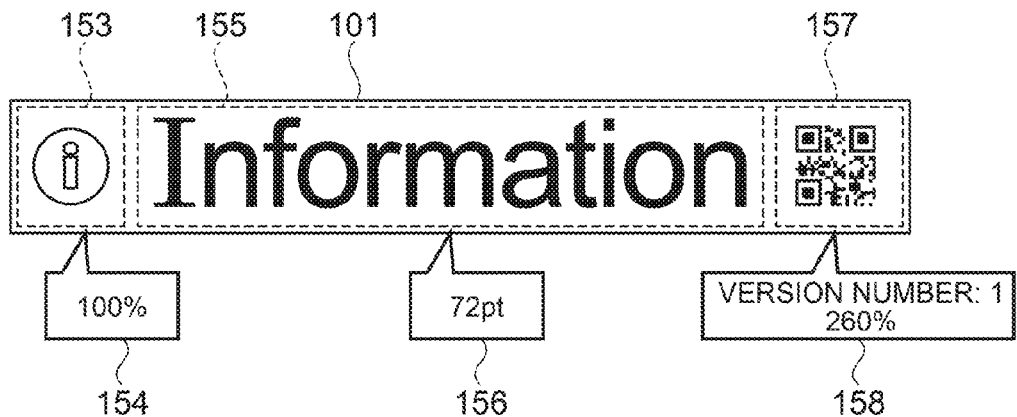
FIG. 20 shows a display example in which the size of a letter in the label image (with no outer frame set) in the variation is changed.

Variation 2 will be described with reference to FIG. 20. FIG. 20 shows a display example in which the letter size in a label image (with no outer frame set) in the variation is changed.

In the embodiments and the variation described above, the drawing processing section 53 automatically calculates the position and size of each object both in the case where an outer frame is set and the case where no outer frame is set and draws the objects in the label image 101, but the drawing processing section 53 may instead be configured to be capable of changing the size and position of each of the objects after the objects are drawn in the label image 101.

FIG. 20 shows an example in which the size of the letter font of the letter 155 is changed to 72 pt. In the case where no outer frame is set, after the drawing processing section 53 sets the letter supplementary information 156 at 65 pt (FIG. 19), the operation section 20 (touch panel) is so operated that the numeral of 65 pt in the letter supplementary information 156 is changed to a numeral of 72 pt. The drawing processing section 53 recalculates the size of the letter 155 and draws the label image 101.

As described above, since the size and other factors of an object can be changed while looking at the label image 101, label images 101 having a variety of designs can be created.

Variation 3

Variation 3 will be described with reference to FIG. 21.

Figure 21:
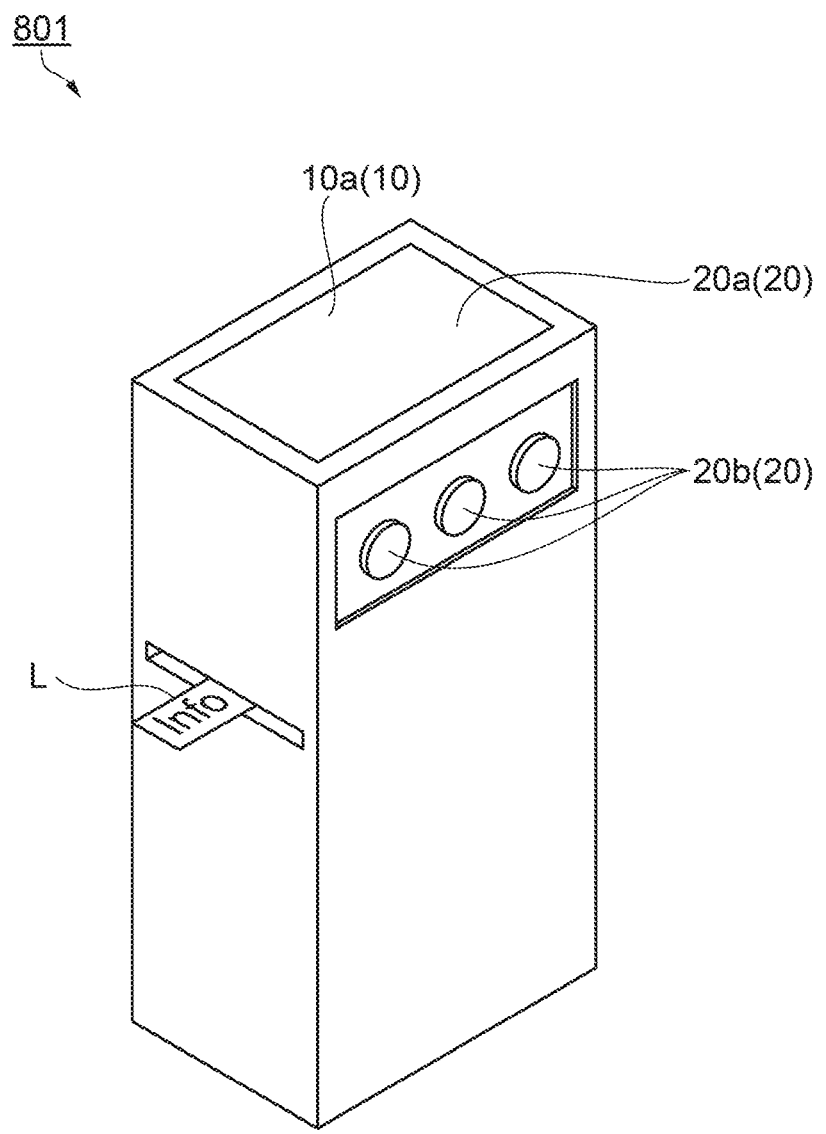
FIG. 21 shows an exterior appearance of a label creation apparatus in the variation.

FIG. 21 shows an exterior appearance of a label creation apparatus in the variation.

In the embodiments and the variations described above, the display section 10 and the operation section 20 are separate from the print apparatus 7, as shown in FIG. 1, but the invention is not limited to the configuration described above. The print apparatus 7 may be provided with the display section 10 and the operation section 20. In a label creation apparatus 801 shown in FIG. 21, the print apparatus 7 (FIG. 1), which creates a label L, is provided with an operation section 10a and an operation section 20a as well as an operation section 20b. The display section 10a is a display panel that displays the label editing screen 100, such as an LCD. The operation section 20a is a touch panel that covers the display panel, and the operation section 20b is formed, for example, of button switches.

The thus configured label creation apparatus 801, which has a simple configuration formed of a single apparatus, can draw and print the label image 101.

Variation 4

The first object described in the above embodiments and variations may be an AR (augmented reality) marker that allows representation of image data, still images and video images, stereoscopic images, and other images formed of patterned voice data.

Variation 5

The second object described in the above embodiments and variations may be a data file formed of one of the transparent layer and the drawing layer, a surrounding pattern having a plurality of window areas in the transparent layer, or a data file formed of discontinuous areas set to be transparent in the transparent layer.

Variation 6

The first object described in the above embodiments and variations is arranged from the start position of the window area of the second object by using a position and a size that prevent the first object from overlapping with the second object, but the arrangement described above is not necessarily employed, and the first object may be arranged in a position where the first object overlaps with the second object.

Figure 22:
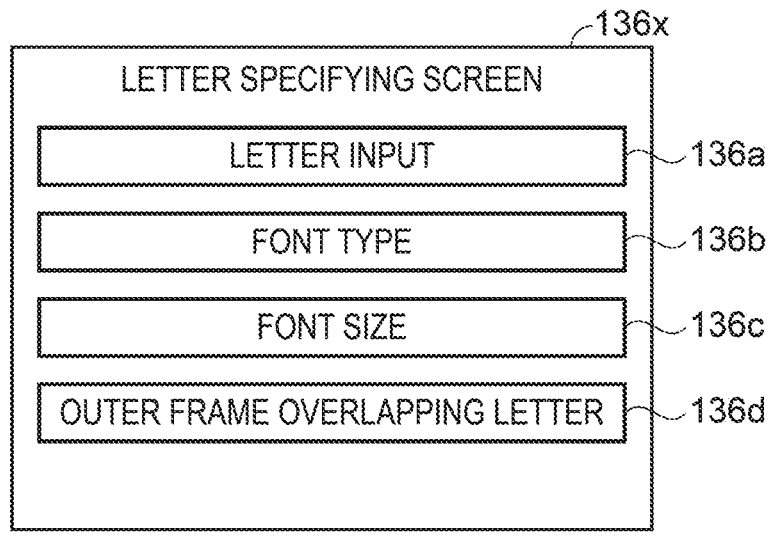
FIG. 22 shows an example of a letter specifying screen in the variation.
Figure 23:
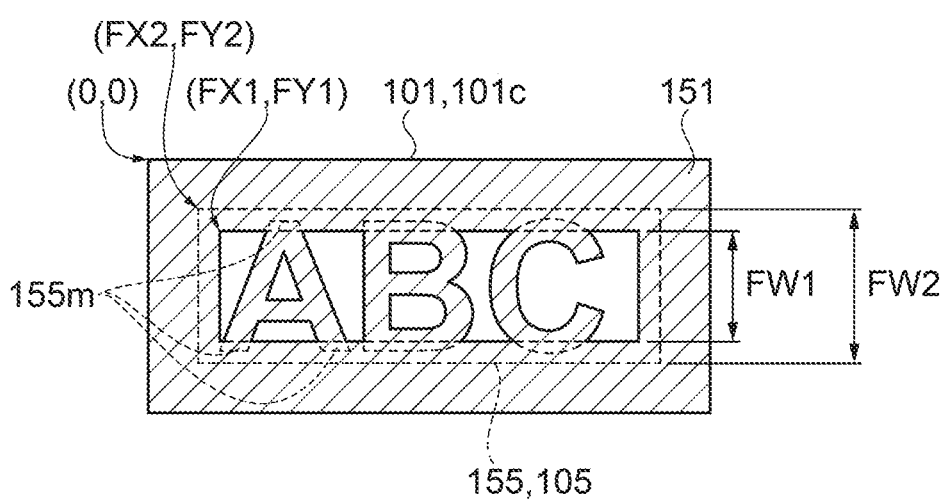
FIG. 23 is a descriptive diagram showing the position and size of an image editing area in the variation.

FIG. 22 shows an example of a letter specifying screen in a variation. FIG. 23 is a descriptive diagram showing the position and size of an image editing area in the variation.

A letter specifying screen 136x shown in FIG. 22 is formed of the letter specifying screen 136 displayed in the label editing screen 100 (FIG. 4) to which an outer frame overlapping letter button 136d is further added. The outer frame overlapping letter button 136d is a button widget that becomes effective when both the letter 155 and the outer frame 151 are set in the label image 101 or the image editing area 101c.

In a state in which the outer frame overlapping letter button 136d is tapped and therefore selected and a state in which the outer frame overlapping letter button 136d is tapped again and is therefore not selected, the display color of the button top of the outer frame overlapping letter button 136d differs in the two states, and the start position of the window area of the outer frame 151 and the size of the letter 155 are changed at the same time. Specifically, in the state in which the outer frame overlapping letter button 136*d* is selected, the start position of the window area of the outer frame 151 is set to have coordinates (FX2, FY2), and the width of the bounding box 105 of the letter 155 is set at FW2, as shown in FIG. 23. In the state in which the outer frame overlapping letter button 136*d* is not selected, the start position of the window area of the outer frame 151 is set to have coordinates (FX1, FY1), and the width of the bounding box 105 (not shown) of the letter 155 is set at FW1, as shown in FIG. 23. The processes described above can be implemented by the drawing processing section 53.

In the state in which the outer frame overlapping letter button 136*d* is selected, the area where the outer frame 151 is drawn and the area where the letter 155 is drawn are so arranged that boundary areas of the two areas overlap with each other. Look at the letter "A" of a letter string "ABC" shown in FIG. 23 by way of example. Areas 155*m* are the areas where the overlapping occurs.

As described above, the label image 101 in which the outer frame 151 (second object) and the letter 155 (first object) are so arranged as to overlap with each other in the areas 155*m* (boundary areas) can be drawn, whereby the number of variations of the design of the created label L can be increased.

What is claimed is:

1. A label creation apparatus that creates a label printed on a medium, the apparatus comprising:
   a drawing processing section that draws a label image of the label;
   a first object specifying section that specifies a position and a size of a first object to be drawn in the label image;
   a second object specifying section that specifies whether or not a second object is to be drawn in the label image, the second object having a window area transparent to the first object drawn in the label image and having a drawing area along an outermost contour of the label image; and
   a print section that prints the drawn label image on the medium,
   wherein
      when the second object specifying section specifies that the second object is to be drawn in the label image, the drawing processing section draws the first object in the label image in such a way that the first object falls within the window area of the second object, and
      when the second object specifying section specifies that the second object is not to be drawn in the label image, the drawing processing section draws the first object in the label image in such a way that the first object extends to an area containing the outermost contour of the label image.

2. The label creation apparatus according to claim 1, wherein
   when the second object specifying section specifies that the second object is to be drawn in the label image, the drawing processing section calculates, on the basis of information on a position and a size of the window area, the position and the size in accordance with which the first object is drawn in the label image, and
   when the second object specifying section specifies that the second object is not to be drawn in the label image, the drawing processing section calculates, on the basis of a size of the label image, the position and the size in accordance with which the first object is drawn in the label image.

3. The label creation apparatus according to claim 1, wherein the drawing processing section includes a medium selection processing section that selects, on the basis of a size of the label image and at least one of a data density, an arrangement position, and the size of the first object that are specified by the first object specifying section, a candidate of a size of the medium on which the label image is printed.

4. The label creation apparatus according to claim 3, wherein when the first object is drawn in a position or at a size that causes the first object to extend off an area of the label image, the medium selection processing section selects, as the candidate, a size of the medium in such a way that the size corresponds to an area including the label image and extended to the area where the first object is drawn.

5. The label creation apparatus according to claim 3, wherein the medium selection processing section calculates an object print size that reflects the data density of the first object and selects, as the candidate, a size of the medium in such a way that the size is based on the object print size.

6. The label creation apparatus according to claim 1, wherein when the second object specifying section specifies that the second object is to be drawn in the label image, the drawing processing section calculates the position and the size in accordance with which the first object is so drawn that boundary areas of the first object and the second object overlap with each other.

7. The label creation apparatus according to claim 1, wherein the first object includes at least one of image data, letter font data, and image data formed of readably patterning letter information.

8. The label creation apparatus according to claim 1, wherein the second object is a surrounding pattern that surrounds the first object in the label image.

9. The label creation apparatus according to claim 1, further comprising a display section that displays the label image of the label.

10. A label creation method for creating a label printed on a medium, the method comprising:
   a drawing processing step of drawing a label image of the label;
   a first object specifying step of specifying a position and a size of a first object to be drawn in the label image; and
   a second object specifying step of specifying whether or not a second object is to be drawn in the label image, the second object having a window area transparent to the first object drawn in the label image and having a drawing area along an outermost contour of the label image,
   wherein
      when the second object specifying step specifies that the second object is to be drawn in the label image, the drawing processing step draws the first object in the label image in such a way that the first object falls within the window area of the second object, and
      when the second object specifying step specifies that the second object is not to be drawn in the label image, the drawing processing step draws the first object in the label image in such a way that the first object extends to an area containing the outermost contour of the label image.

11. A label creation program that causes a computer to execute the label creation method according to claim 10.

* * * * *